United States Patent
Kurashige et al.

(10) Patent No.: US 8,950,871 B2
(45) Date of Patent: Feb. 10, 2015

(54) PROJECTION DEVICE AND PROJECTION-TYPE VIDEO DISPLAY DEVICE

(75) Inventors: Makio Kurashige, Kashiwa (JP); Kazutoshi Ishida, Saitama (JP); Tomoe Takanokura, Katsushika-Ku (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 115 days.

(21) Appl. No.: 13/821,082

(22) PCT Filed: Sep. 8, 2011

(86) PCT No.: PCT/JP2011/070514
§ 371 (c)(1),
(2), (4) Date: Mar. 6, 2013

(87) PCT Pub. No.: WO2012/033170
PCT Pub. Date: Mar. 15, 2012

(65) Prior Publication Data
US 2013/0169941 A1    Jul. 4, 2013

(30) Foreign Application Priority Data
Sep. 8, 2010    (JP) .................. 2010-201419

(51) Int. Cl.
*G03B 21/14*        (2006.01)
*G02B 27/48*        (2006.01)
(Continued)

(52) U.S. Cl.
CPC ............ *G02B 27/48* (2013.01); *G03B 21/2033* (2013.01); *G03H 1/00* (2013.01);
(Continued)

(58) Field of Classification Search
USPC ............ 353/30, 31, 37, 94; 359/201.1, 202.2, 359/204.2, 204.4; 349/5, 7, 8; 348/771
See application file for complete search history.

(56) References Cited

U.S. PATENT DOCUMENTS 5,313,479 A    5/1994    Florence
6,309,072 B1*  10/2001   Deter .............................. 353/31
(Continued)

FOREIGN PATENT DOCUMENTS

JP    06-208089 A1    7/1994
JP    2004-038012 A1  2/2004
(Continued)

OTHER PUBLICATIONS

Joseph W. Goodman, "Speckle Phenomena in Optics Theory and Applications," Chapter 6, Speckle in Certain Imaging Applications, Roberts & Co., 2006, pp. 187-233.
(Continued)

*Primary Examiner* — William C Dowling
(74) *Attorney, Agent, or Firm* — Burr & Brown, PLLC

(57) ABSTRACT

Provided are a projection device and a projection-type video display device capable of displaying a plurality of videos, allowing speckles to be inconspicuous, and miniaturizing an optical system. A projection device includes an optical element including light diffusion elements capable of diffusing light, an irradiation device configured to irradiate the optical element with illumination light beams, each illumination light beam scanning the corresponding light diffusion element, spatial light modulators, each spatial light modulator being illuminated with illumination light beam which is incident from the irradiation device to each light diffusion element to be diffused, and projection optical systems, each projection optical system projecting modulation image obtained on each spatial light modulator on corresponding screen. The illumination light beam, which is incident to each position of each light diffusion element to be diffused, overlappedly illuminates on corresponding spatial light modulator.

19 Claims, 9 Drawing Sheets

(51) Int. Cl.
*G03B 21/20* (2006.01)
*G03H 1/00* (2006.01)
*G03H 1/22* (2006.01)
*G03H 1/32* (2006.01)
*H04N 9/31* (2006.01)

(52) U.S. Cl.
CPC .............. *G03H 1/22* (2013.01); *G03H 1/2286* (2013.01); *G03H 1/32* (2013.01); *H04N 9/3129* (2013.01); *H04N 9/3147* (2013.01); *G03B 21/208* (2013.01); *G03H 2222/36* (2013.01)
USPC .............. 353/30; 353/94; 353/98; 359/202.2; 359/204.2; 359/204.4

(56) References Cited

U.S. PATENT DOCUMENTS

| | | | |
|---|---|---|---|
| 7,014,318 B2* | 3/2006 | Dho | 353/31 |
| 7,470,028 B2 | 12/2008 | Miller | |
| 8,350,789 B2 | 1/2013 | Furuya et al. | |
| 8,444,272 B2* | 5/2013 | Cobb | 353/31 |
| 8,561,667 B1* | 10/2013 | Hanley et al. | 160/168.1 R |
| 2004/0004586 A1 | 1/2004 | Endo et al. | |
| 2008/0259223 A1* | 10/2008 | Read et al. | 348/745 |
| 2010/0020291 A1 | 1/2010 | Kasazumi et al. | |

FOREIGN PATENT DOCUMENTS

| | | |
|---|---|---|
| JP | 2004-264512 | 9/2004 |
| JP | 2006-522942 A | 10/2006 |
| JP | 2008-262029 A1 | 10/2008 |
| JP | 2009-288803 A | 12/2009 |
| WO | 01/81996 A1 | 11/2001 |
| WO | 2006/137326 A1 | 12/2006 |
| WO | 2007/119723 A1 | 10/2007 |

OTHER PUBLICATIONS

International Search Report dated Oct. 18, 2011.
Japanese Office Action (With English Translation), Japanese Application No. 2012-533024, dated Sep. 19, 2014 (5 pages).

* cited by examiner

PROJECTION DEVICE AND PROJECTION-TYPE VIDEO DISPLAY DEVICE

TECHNICAL FIELD

The present invention relates to a projection device and a projection-type video display device displaying a plurality of videos by using a coherent light beam, and more particularly, to a projection device and a projection-type video display device capable of allowing occurrence of speckles to be inconspicuous.

BACKGROUND ART

A projection-type video display device, including a screen and a projection device which projects a video image on the screen, has been widely used. In a typical projection-type video display device, a two-dimensional image as a basic image is generated by using a spatial light modulator such as a liquid crystal micro display or a DMD (digital micromirror device), and the two-dimensional image is magnified and projected on a screen by using a projection optical system, so that a video is displayed on the screen.

As the projection device, various types including a commercialized product called an "optical type projector" have been proposed. In a general optical type projector, the spatial light modulator such as a liquid crystal display is illuminated by using an illumination device including a white light source such as a high pressure mercury lamp, and an obtained modulation image is magnified and projected on the screen by using lenses. For example, Patent Literature 1 listed below discloses a technique where a white light beam generated by a supper-high pressure mercury lamp is divided into three primary color components R, G, and B by a dichroic mirror, the light beams are guided to spatial light modulators corresponding to the primary colors, generated modulation images corresponding to the primary colors are combined by a cross dichroic prism to be projected on the screen.

As an application of the projection device and the projection-type video display device, a projection device which projects video image corresponding to each screen on a plurality of the screens is known. In addition, a technique where signals representing different images can be output from one information processing terminal is also known, and video is displayed on a plurality of the screens by using the technique and the projection device.

A plurality of the projection devices are needed in order to project the video light beam corresponding to each screen on a plurality of the screens. At this time, although a plurality of the spatial light modulators and a plurality of the projection optical systems are needed, it has been considered that the projection device can be miniaturized by commonly using the illumination device illuminating the spatial light modulators.

However, the illumination device of the related art uses a high pressure mercury lamp, an LED, or the like as a light source to spread a light beam of the light source and transmit the light beam. In the illumination device of the related art, since the light beam is spread, there is a loss in light intensity, and there is a problem in that an optical system becomes large.

Further, high intensity discharge lamp such as a high pressure mercury lamp has a relatively short lifecycle, and in the case where the lamp is used for an optical type projector or the like, the lamp needs to be frequently replaced. In addition, since a relatively large optical system such as a dichroic mirror is needed in order to extract the light beams of the primary color components, there is a problem in that the size of the whole apparatus is increased as described above.

In order to cope with this problem, a type using a coherent light source such as a laser is also proposed. For example, a semiconductor laser which is widely used in industries has a very long lifecycle in comparison with the high intensity discharge lamp such as a high pressure mercury lamp. In addition, since the laser source is a light source capable of generating light having a single wavelength, a spectroscopic apparatus such as a dichroic mirror is unnecessary, so that there is an advantage in that the whole apparatus can be miniaturized. Further, since the diameter of the light beam of the laser can be easily controlled, a loss of light may not easily occur.

On the other hand, in the type using the coherent light source such as a laser source, there is another problem in that speckles occur. The speckle is a punctate pattern which occurs when the coherent light beam such as a laser beam is irradiated on a scattering plane. If the speckle occurs on the screen, it is observed as punctate luminance irregularity (brightness irregularity), so that it becomes a factor of exerting physiologically bad influence on the observer. The reason why the speckles occur in the case of using the coherent light beam is that the coherent light beams reflected from portions of the scattering reflecting plane such as a screen have very high coherency, and the speckles are generated through interference therebetween. For example, in Non Patent Literature 1 listed below, theoretical review of the occurrence of speckles is made in detail.

In the type of using the coherent light source, since there is an intrinsic problem in that the speckles occur, techniques for suppressing the occurrence of speckles have been proposed. For example, Patent Literature 2 listed below discloses a technique where a scattering plate is irradiated with a laser beam, an obtained scattered light beam is guided to a spatial light modulator, and the scattering plate is driven to rotate by a motor, so that speckles are reduced.

CITATION LIST

Patent Literature

Patent Literature 1: JP 2004-264512 A
Patent Literature 2: JP 6-208089 A

Non Patent Literature

Non Patent Literature 1: Speckle Phenomena in Optics, Joseph W. Goodman, Roberts & Co., 2006

SUMMARY OF INVENTION

Problem to be Solved by the Invention

As described above, with respect to the projection device and the projection-type video display device using the coherent light source, the techniques for reducing speckles which have been proposed up to now may not effectively and sufficiently suppress the speckles. For example, in the method disclosed in Patent Literature 2 described above, since the laser beams irradiated on the scattering plate are scattered, a portion of the laser beams are lost without contribution to video display. In addition, the scattering plate needs to be rotated in order to reduce the speckles, the mechanical rotation mechanism becomes a relatively large apparatus, and the power consumption is increased. Moreover, although the scattering plate is rotated, the position of the optical axis of the illumination light beam is not changed, so that the speckles occurring due to the diffusion on the screen may not be sufficiently suppressed.

The inventors have researched based on the problems described hereinbefore, so that the inventors contrived a projection device and a projection-type video display device displaying a plurality of videos by using a coherent light beam, which are capable of allowing speckles to be inconspicuous and miniaturizing optical systems. In other words, the present invention is to provide a projection device and projection-type video display device which can display a plurality of videos and which are capable of allowing speckles to be inconspicuous and miniaturizing optical systems.

Means for Solving the Problem

According to the present invention, there is provided a first projection device displaying video corresponding to each screen on a plurality of the screens, including:

an optical element including a plurality of light diffusion elements capable of diffusing light;

an irradiation device configured to irradiate the optical element with a plurality of illumination light beams, each illumination light beam scanning the corresponding light diffusion element;

spatial light modulators, each spatial light modulator being illuminated with illumination light beam which is incident from the irradiation device to each light diffusion element to be diffused; and projection optical systems, each projection optical system projecting modulation image obtained on each spatial light modulator on corresponding screen, wherein the illumination light beam, which is incident to each position of each light diffusion element to be diffused, overlappedly illuminates on corresponding spatial light modulator, and wherein the irradiation device includes:

a light source configured to generate a coherent light beam;

a light division unit configured to divide the coherent light beam from the light source to generate a plurality of divided light beams;

optical fibers, each optical fiber transmitting each divided light beam from the light division unit; and a scan device configured to change propagation direction of each divided light beam transmitted by the optical fibers and allow each divided light beam as each illumination light beam to scan the corresponding light diffusion element.

According to the present invention, there is provided a second projection device displaying video corresponding to each screen on a plurality of the screens, including:

an optical element including a plurality of light diffusion elements capable of reproducing images of scattering plates in corresponding illuminated regions;

an irradiation device configured to irradiate the optical element with a plurality of illumination light beams, each illumination light beam scanning the corresponding light diffusion element;

spatial light modulators, each spatial light modulator disposed to position which overlap each illuminated region; and projection optical systems, each projection optical system projecting modulation image obtained on each spatial light modulator on corresponding screen, wherein the illumination light beam incident from the irradiation device to each position of each light diffusion element is allowed to reproduce the image of the scattering plate corresponding to each light diffusion element in the corresponding illuminated region, and wherein the irradiation device includes:

a light source configured to generate a coherent light beam;

a light division unit configured to divide the coherent light beam from the light source to generate a plurality of divided light beams;

optical fibers, each optical fiber transmitting each divided light beam from the light division unit; and a scan device configured to change propagation direction of each divided light beam transmitted by the optical fibers and allow each divided light beam as each illumination light beam to scan the corresponding light diffusion element.

In the first or second projection device of the present invention, the scan device may include mirrors which reflect the divided light beams and change propagation direction of each divided light beam by changing a direction of each mirror.

In the first or second projection device of the present invention, the scan device may change propagation direction of each divided light beam by changing direction of emitting end of each optical fiber.

In the first or second projection device of the present invention, each divided light beam may be irradiated to one point of the corresponding mirror, each divided light beam reflected by the one point of the mirror constitutes a diverging flux from the corresponding one point, and each diverging flux is incident on the corresponding light diffusion element.

In the first or second projection device of the present invention, each divided light beam may be irradiated to one point of the corresponding mirror, and each divided light beam reflected by the one point of the mirror may constitute a diverging flux from the corresponding one point, and the projection device may further include a parallel light generation unit which propagates each light beam constituting each diverging flux in a certain direction to generate parallel light flux and allow each parallel light flux to be incident on the corresponding light diffusion element.

According to the present invention, there is provided a third projection device displaying video corresponding to each screen on a plurality of the screens, including:

an optical element including a plurality of light diffusion elements capable of diffusing light;

an irradiation device configured to irradiate the optical element with a plurality of illumination light beams, each illumination light beam scanning the corresponding light diffusion element;

spatial light modulators, each spatial light modulator being illuminated with illumination light beam which is incident from the irradiation device to each light diffusion element to be diffused; and projection optical systems, each projection optical system projecting modulation image obtained on each spatial light modulator on corresponding screen, wherein the illumination light beam, which is incident to each position of each light diffusion element to be diffused, overlappedly illuminates on corresponding spatial light modulator, and wherein the irradiation device includes:

a light source configured to generate a coherent light beam;

a light division unit configured to divide the coherent light beam from the light source to generate a plurality of divided light beams;

a scan device configured to change propagation direction of each divided light beam from the light division unit; and optical fibers, each optical fiber transmitting each divided light beam incident from the scan device and irradiating the optical element with each divided light beam as each illumination light beam, and wherein the scan device allows each illumination light beam to scan the corresponding light diffusion element.

According to the present invention, there is provided a fourth projection device displaying video corresponding to each screen on a plurality of the screens, including:

an optical element including a plurality of light diffusion elements capable of reproducing images of scattering plates in corresponding illuminated regions;

an irradiation device configured to irradiate the optical element with a plurality of illumination light beams, each illumination light beam scanning the corresponding light diffusion element;

spatial light modulators, each spatial light modulator disposed to position which overlap each illuminated region; and projection optical systems, each projection optical system projecting modulation image obtained on each spatial light modulator on corresponding screen, wherein the illumination light beam incident from the irradiation device to each position of each light diffusion element is allowed to reproduce the image of the scattering plate corresponding to each light diffusion element in the corresponding illuminated region, and wherein the irradiation device includes:

a light source configured to generate a coherent light beam;

a light division unit configured to divide the coherent light beam from the light source to generate a plurality of divided light beams;

a scan device configured to change propagation direction of each divided light beam from the light division unit; and optical fibers, each optical fiber transmitting each divided light beam incident from the scan device and irradiating the optical element with each divided light beam as each illumination light beam, and wherein the scan device allows each illumination light beam to scan the corresponding light diffusion element.

In the third or fourth projection device of the present invention, each illumination light beam may constitute a diverging flux from an emitting end of the corresponding optical fiber, and each diverging flux may be incident on the corresponding light diffusion element.

According to the present invention, there is provided a fifth projection device displaying video corresponding to each screen on a plurality of the screens, including:

an optical element including a plurality of light diffusion elements capable of diffusing light;

an irradiation device configured to irradiate the optical element with a plurality of illumination light beams, each illumination light beam scanning the corresponding light diffusion element;

spatial light modulators, each spatial light modulator being illuminated with illumination light beam which is incident from the irradiation device to each light diffusion element to be diffused; and projection optical systems, each projection optical system projecting modulation image obtained on each spatial light modulator on corresponding screen, wherein the illumination light beam, which is incident to each position of each light diffusion element to be diffused, overlappedly illuminates on corresponding spatial light modulator, and wherein the irradiation device includes:

a light source configured to generate a coherent light beam;

a light division unit configured to divide the coherent light beam from the light source to generate a plurality of divided light beams;

mirror optical systems, each mirror optical system transmitting each divided light beam from the light division unit; and a scan device configured to change propagation direction of each divided light beam incident from the mirror optical systems and allow each divided light beam as each illumination light beam to scan the corresponding light diffusion element.

According to the present invention, there is provided a sixth projection device displaying video corresponding to each screen on a plurality of the screens, including:

an optical element including a plurality of light diffusion elements capable of reproducing images of scattering plates in corresponding illuminated regions;

an irradiation device configured to irradiate the optical element with a plurality of illumination light beams, each illumination light beam scanning the corresponding light diffusion element;

spatial light modulators, each spatial light modulator disposed to position which overlap each illuminated region; and projection optical systems, each projection optical system projecting modulation image obtained on each spatial light modulator on corresponding screen, wherein the illumination light beam incident from the irradiation device to each position of each light diffusion element is allowed to reproduce the image of the scattering plate corresponding to each light diffusion element in the corresponding illuminated region, and wherein the irradiation device includes:

a light source configured to generate a coherent light beam;

a light division unit configured to divide the coherent light beam from the light source to generate a plurality of divided light beams;

mirror optical systems, each mirror optical system transmitting each divided light beam from the light division unit; and a scan device configured to change propagation direction of each divided light beam incident from the mirror optical systems and allow each divided light beam as each illumination light beam to scan the corresponding light diffusion element.

In the fifth or sixth projection device of the present invention, the scan device may include mirrors which reflect the divided light beams and change propagation direction of each divided light beam by changing a direction of each mirror, and each divided light beam may be irradiated to one point of the corresponding mirror, each divided light beam reflected by the one point of the mirror may constitute a diverging flux from the corresponding one point, and each diverging flux may be incident on the corresponding light diffusion element.

In the fifth or sixth projection device of the present invention, the scan device may include mirrors which reflect the divided light beams and change propagation direction of each divided light beam by changing a direction of each mirror, each divided light beam may be irradiated to one point of the corresponding mirror, each divided light beam reflected by the one point of the mirror may constitute a diverging flux from the corresponding one point, and the projection device may further include a parallel light generation unit which propagates each light beam constituting each diverging flux in a certain direction to generate parallel light flux and allow each parallel light flux to be incident on the corresponding light diffusion element.

According to the present invention, there is provided a seventh projection device displaying video corresponding to each screen on a plurality of the screens, including:

an optical element including a plurality of light diffusion elements capable of diffusing light;

an irradiation device configured to irradiate the optical element with a plurality of illumination light beams, each illumination light beam scanning the corresponding light diffusion element;

spatial light modulators, each spatial light modulator being illuminated with illumination light beam which is incident from the irradiation device to each light diffusion element to be diffused; and projection optical systems, each projection optical system projecting modulation image obtained on each spatial light modulator on corresponding screen, wherein the illumination light beam, which is incident to each position of each light diffusion element to be diffused, overlappedly illuminates on corresponding spatial light modulator, and wherein the irradiation device includes:

a light source configured to generate a coherent light beam;

a scan device configured to change a propagation direction of the coherent light beam from the light source;

a collimation optical system configured to collimate the coherent light beam from the scan device;

a light division unit configured to divide the collimated coherent light beam to generate a plurality of divided light beams; and mirror optical systems, each mirror optical system transmitting each divided light beam from the light division unit and irradiating the optical element with each divided light beam as each illumination light beam, and wherein the scan device allows each illumination light beam to scan the corresponding light diffusion element.

According to the present invention, there is provided an eighth projection device displaying video corresponding to each screen on a plurality of the screens, including:

an optical element including a plurality of light diffusion elements capable of reproducing images of scattering plates in corresponding illuminated regions;

an irradiation device configured to irradiate the optical element with a plurality of illumination light beams, each illumination light beam scanning the corresponding light diffusion element;

spatial light modulators, each spatial light modulator disposed to position which overlap each illuminated region; and projection optical systems, each projection optical system projecting modulation image obtained on each spatial light modulator on corresponding screen, wherein the illumination light beam incident from the irradiation device to each position of each light diffusion element is allowed to reproduce the image of the scattering plate corresponding to each light diffusion element in the corresponding illuminated region, and wherein the irradiation device includes:

a light source configured to generate a coherent light beam;

a scan device configured to change a propagation direction of the coherent light beam from the light source;

a collimation optical system configured to collimate the coherent light beam from the scan device;

a light division unit configured to divide the collimated coherent light beam to generate a plurality of divided light beams; and mirror optical systems, each mirror optical system transmitting each divided light beam from the light division unit and irradiating the optical element with each divided light beam as each illumination light beam, and wherein the scan device allows each illumination light beam to scan the corresponding light diffusion element.

In the seventh or eighth projection device of the present invention, each illumination light beam may constitute a parallel light flux, and each parallel light flux may be incident on the corresponding light diffusion element.

According to the present invention, there is provided a projection-type video display device including:

any one of the first to eighth projection device; and screens on which modulation images obtained on the spatial light modulators are projected.

In any one of the first to eighth projection device of the present invention, the light diffusion element may be a hologram recording medium.

In any one of the first to eighth projection device of the present invention, the light diffusion element may be a lens array.

Advantageous Effects of Invention

According to the present invention, it is possible to display a plurality of videos, to allow speckles to be inconspicuous, and to miniaturize an optical system.

DESCRIPTION OF EMBODIMENTS

Figure 1:
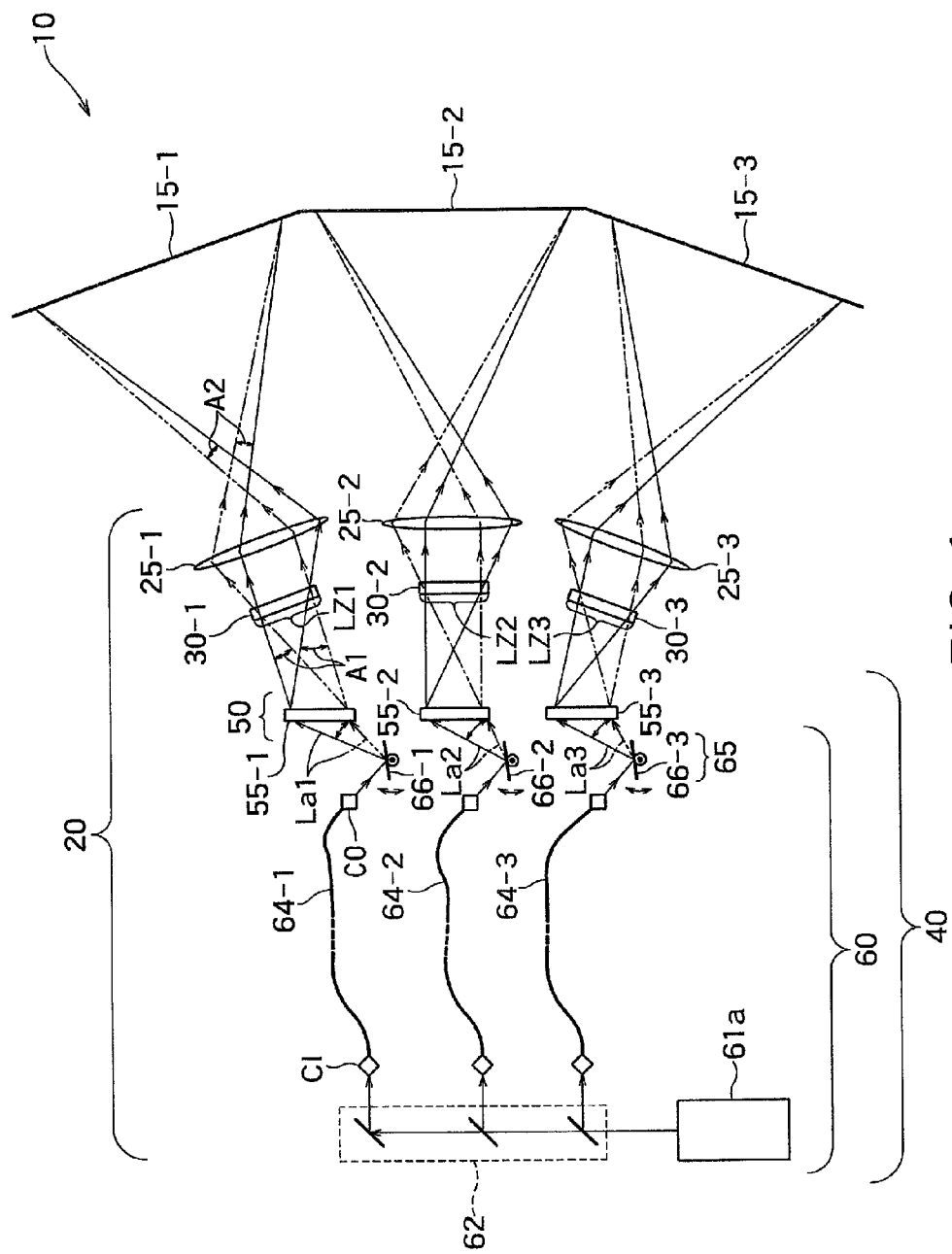
FIG. 1 is a schematic diagram illustrating configurations of an illumination device, a projection device, and a projection-type video display device according to a specific example of a basic embodiment as a diagram illustrating the basic embodiment among embodiments of the present invention.

Hereinafter, embodiments of the present invention will be described with reference to the drawings. Note that, in the drawings attached to the specification, for the better understanding and the convenience of illumination, reduction scales, aspect ratios, and the like are exaggerated differently from those of real objects.

A projection device and a projection-type video display device according to the embodiments of the present invention have a basic configuration capable of effectively preventing speckles from occurring.

In the description hereinafter, first, a configuration which is capable of allowing speckles to be inconspicuous and displaying a plurality of videos, and functions and effects which can be obtained based on the configuration will be described as a basic embodiment with reference to a projection-type video display device including a projection device illustrated in FIGS. 1 to 5. After that, a modified embodiment will be described.

Basic Embodiment

Configuration of Basic Embodiment

First, a configuration of a projection-type video display device which includes an illumination device and a projection device projecting coherent light beams and which is capable of allowing speckles to be inconspicuous to display a plurality of videos will be described mainly with reference to FIGS. 1 to 5.

The projection-type video display device 10 illustrated in FIG. 1 includes three screens 15-1, 15-2, and 15-3 and a projection device 20 which projects video light beams including corresponding coherent light beams to the screens 15-1, 15-2, and 15-3. The projection device 20 includes an illumination device 40 which simultaneously illuminates three illuminated regions LZ1, LZ2, and LZ3 located on a virtual plane with the coherent light beams, three spatial light modulators 30-1, 30-2, and 30-3 which are disposed at positions overlapping the illuminated regions LZ1 to LZ3 and are illuminated with the coherent light beams by the illumination device 40, and three projection optical systems 25-1, 25-2, and 25-3 which project each modulation image obtained on each of the spatial light modulators 30-1 to 30-3 to the corresponding screen 15-1 to 15-3 respectively.

For example, a transmission-type liquid crystal micro display may be used as the spatial light modulators 30-1 to 30-3. In this case, each of the spatial light modulators 30-1 to 30-3 which are illuminated in a planar shape by the illumination device 40 selectively transmits the coherent light beam for each pixel, so that each of the modulation images is formed on the screen of each display constituting each of the spatial light modulators 30-1 to 30-3. The modulation images (video light beams) obtained in this manner are changed in magnification and projected to the corresponding screens 15-1 to 15-3 by the projection optical systems 25-1 to 25-3. Therefore, the modulation images are displayed on the screens 15-1 to 15-3 with changed magnification (generally, enlargement), so that an observer can observe the three images.

Note that, a reflection-type micro display may be used as the spatial light modulators 30-1 to 30-3. In this case, the modulation images are formed by reflected light beams in the spatial light modulators 30-1 to 30-3, and the plane irradiated with the coherent light beams illuminated from the illumination device 40 to the spatial light modulators 30-1 to 30-3 and the plane of the video light beams constituting the modulation images progressing from the spatial light modulators 30-1 to 30-3 are the same plane. In the case where the reflected light beams are used, a MEMS element such as a DMD (Digital Micromirror Device) may be used as the spatial light modulators 30-1 to 30-3. In the apparatus disclosed in the Patent Literature 2 described above, the DMD is used as a spatial light modulator.

In addition, it is preferable that the incidence planes of the spatial light modulators 30-1 to 30-3 have the same shape and size as the illuminated regions LZ1 to LZ3 which are illuminated with the coherent light beams by the illumination device 40. This is because, in this case, the coherent light beams from the illumination device 40 can be used to display videos on the screens 15-1 to 15-3 with high use efficiency.

The screens 15-1 to 15-3 may be configured as transmission-type screens or as reflection-type screens. In the case where the screens 15-1 to 15-3 are configured as reflection-type screens, an observer observes videos displayed by the coherent light beams reflected by the screens 15-1 to 15-3, from the same side as the projection device 20 with respect to the screens 15-1 to 15-3. On the other hand, in the case where the screens 15-1 to 15-3 are configured as transmission-type screens, the observer observes videos displayed by the coherent light beams passing through the screens 15-1 to 15-3, from the side opposite to the projection device 20 with respect to the screens 15-1 to 15-3.

The coherent light beams projected on the screens 15-1 to 15-3 are diffused to be recognized as videos by an observer. At this time, the coherent light beams projected on the screen interfere with each other due to the diffusion, so that speckles occur. However, in the projection-type video display device 10 described herein, the illumination device 40 described hereinafter is configured to illuminate the illuminated regions LZ1 to LZ3, where the spatial light modulators 30-1 to 30-3 are overlapped, with the coherent light beams of which angles are changed in time. More specifically, although the illumination device 40 described hereinafter illuminates the illuminated regions LZ1 to LZ3 with diffused light beams composed of the coherent light beams, the incident angle of the diffused light beams is changed in time. As a result, the diffusion pattern of the coherent light beams on the screens 15-1 to 15-3 is also changed in time, and the speckles occurring due to the diffusion of the coherent light beams overlap in time, so that the speckles are inconspicuous. Hereinafter, the illumination device 40 will be described more in detail.

Figure 2:
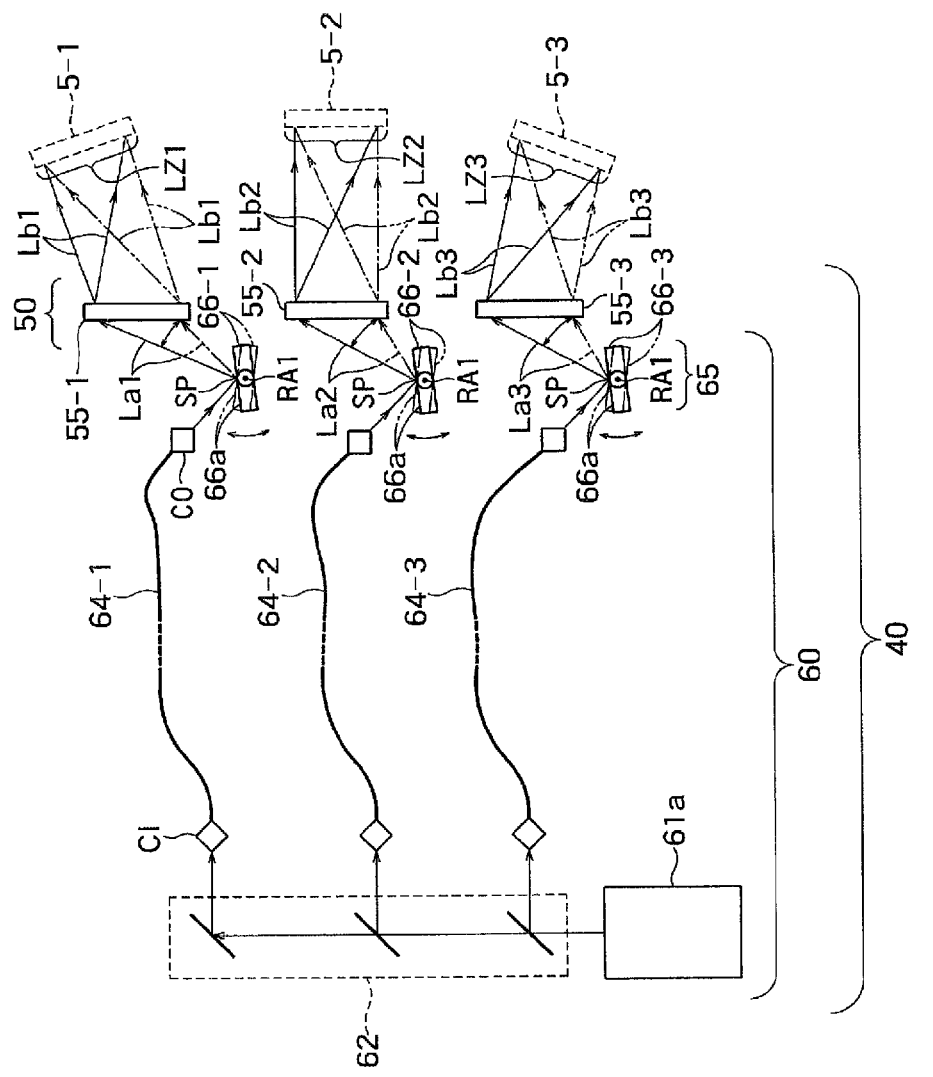
FIG. 2 is a diagram illustrating the illumination device illustrated in FIG. 1.

The illumination device 40 illustrated in FIGS. 1 and 2 includes an optical element 50 which directs the propagation directions of the coherent light beams as the reproduction illumination light beams (illumination light beams) La1, La1, and La3 to the corresponding illuminated regions LZ1 to LZ3 and an irradiation device 60 which irradiates the optical element 50 with the coherent light beams as the reproduction illumination light beams La1 to La3. The optical element 50 includes a hologram recording medium (light diffusion element) 55-1 which can reproduce the image 5-1 of the scattering plate 6, a hologram recording medium (light diffusion element) 55-2 which can reproduce the image 5-2 of the scattering plate 6, and a hologram recording medium (light diffusion element) 55-3 which can reproduce the image 5-3 of the scattering plate 6. In other words, the optical element 50 includes the three hologram recording media 55-1 to 55-3 which can reproduce the images of the scattering plates on the corresponding illuminated regions. In the example illustrated, the optical element 50 is composed of the hologram recording media 55-1 to 55-3.

In the example illustrated, the hologram recording media 55-1 to 55-3 constituting the optical element 50 receive the corresponding reproduction illumination light beams La1 to La3 irradiated from the irradiation device 60 to diffract the reproduction illumination light beams with high efficiency. Particularly, the hologram recording medium 55-1 diffracts the reproduction illumination light beam La1 which is incident to each position thereof, that is, a micro region which is to be called each point thereof, so that the image 5-1 of the scattering plate 6 can be reproduced. The same description can be made with respect to the hologram recording media 55-2 and 55-3.

On the other hand, the irradiation device 60 irradiates the optical element 50 with the reproduction illumination light beams La1 to La3 and allows the reproduction illumination light beams La1 to La3 to scan the corresponding hologram recording media 55-1 to 55-3 of the optical element 50. Therefore, in some instant, a region of the hologram recording medium 55-1 which is irradiated with the reproduction illumination light beam La1 by the irradiation device 60 is a portion of the surface of the hologram recording medium 55-1, and particularly, in the example illustrated, the region is the micro region which is to be called a point.

Next, the reproduction illumination light beam La1 which is irradiated from the irradiation device 60 to scan the hologram recording medium 55-1 is incident on each position (each point or each region (the same will apply hereinafter)) on the hologram recording medium 55-1 with an incident angle satisfying a diffraction condition of the hologram recording medium 55-1. Particularly, as illustrated in FIG. 2, the reproduction illumination light beam La1 which is incident from the irradiation device 60 to each position on the hologram recording medium 55-1 overlappedly reproduces the image 5-1 of the scattering plate 6 on the illuminated region LZ1. In other words, the reproduction illumination light beam La 1 which is incident from the irradiation device 60 to each position of the hologram recording medium 55-1 is diffused (widened) by the optical element 50 to be incident on the illuminated region LZ1.

The same description can be made with respect to the hologram recording media 55-2 and 55-3. In other words, the reproduction illumination light beams La1 to La3 which are incident from the irradiation device 60 to each position of each of the hologram recording media 55-1 to 55-3 allow the images of the scattering plates corresponding to each of the hologram recording media 55-1 to 55-3 to be reproduced on the corresponding illuminated regions. In other words, each of the spatial light modulators 30-1 to 30-3 is illuminated with the reproduction illumination light beam which is incident from the irradiation device 60 to each of the hologram recording media 55-1 to 55-3 to be diffused.

Figure 3:
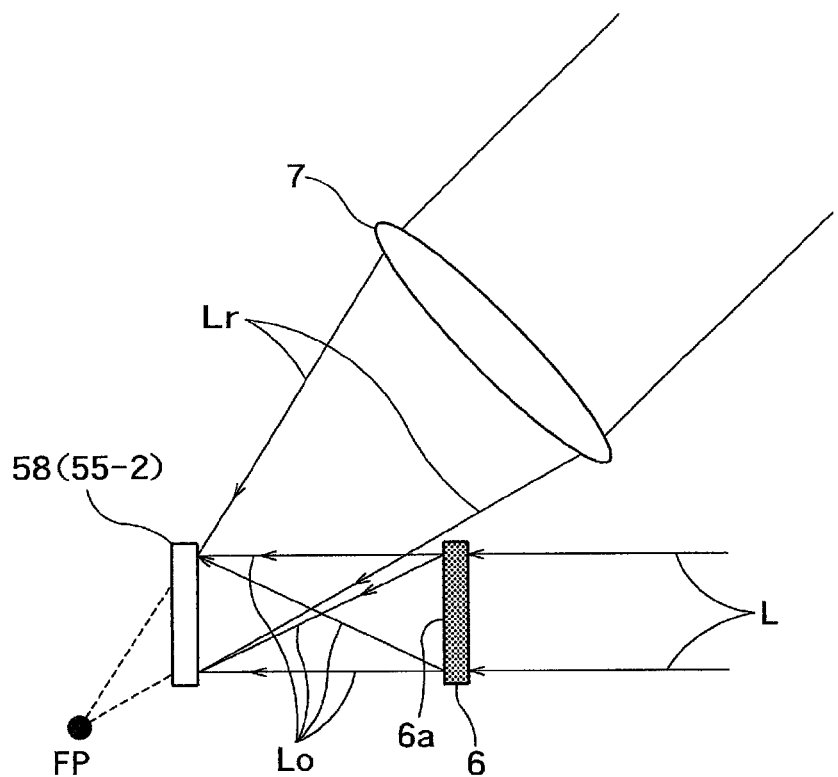
FIG. 3 is a diagram illustrating an exposing method for manufacturing a hologram recording medium constituting an optical element of the illumination device illustrated in FIG. 2.

In the example illustrated, a reflection-type volume hologram using a photopolymer is used as the hologram recording media 55-1 to 55-3 which enable the diffraction function of the reproduction illumination light beams La1 to La3. Herein, as an example, a method of manufacturing the hologram recording medium 55-2 will be described. As illustrated in FIG. 3, the hologram recording medium 55-2 is manufactured by using a scattered light beam from the scattering plate 6 of a real object as an object light beam Lo. FIG. 3 illustrates a state where the hologram photosensitive material 58 having photosensitivity which is to constitute the hologram recording medium 55-2 is exposed by the reference light beam Lr and the object light beam Lo which are mutually coherent.

For example, a laser beam from the laser source which oscillates a laser beam in a specific wavelength range is used as the reference light beam Lr, and the reference light beam Lr passes through the light collection element 7 including lenses to be incident on the hologram photosensitive material 58. In the example illustrated in FIG. 3, the laser beam constituting the reference light beam Lr is incident on the light collection element 7 as a parallel light flux which is parallel to an optical axis of the light collection element 7. The reference light beam Lr passes through the light collection element 7, so that the reference light beam Lr is shaped (transformed) from the parallel light flux to a converging light flux to be incident on the hologram photosensitive material 58. At this time, the focal point FP of the converging light flux Lr is located beyond the hologram photosensitive material 58. In other words, the hologram photosensitive material 58 is disposed between the light collection element 7 and the focal point FP of the converging light flux Lr which is condensed by the light collection element 7.

Next, the object light beam Lo as a scattered light beam from the scattering plate 6 made of, for example, an opal glass, on which the illumination light beam L is incident, is incident on the hologram photosensitive material 58. Here, since the hologram recording medium 55 which is to be manufactured is a transmission-type hologram recording medium, the object light beam Lo is incident from the same plane as that of the reference light beam Lr on the hologram photosensitive material 58. The object light beam Lo needs to have coherence with the reference light beam Lr. Therefore, for example, a laser beam oscillated from the same laser source may be divided, one of the divided beams may be used as the reference light beam Lr described above, and the other may be used as the object light beam Lo.

In the example illustrated in FIG. 3, the parallel light flux which is parallel to the normal direction of the plate plane of the scattering plate 6 is incident on the scattering plate 6 to be scattered, and the scattered light beam passing through the scattering plate 6 is incident as the object light beam Lo on the hologram photosensitive material 58. According to this method, in the case where an isotropic scattering plate which is generally available at low cost is used as the scattering plate 6, the object light beam Lo from the scattering plate 6 can be incident on the hologram photosensitive material 58 with a substantially uniform light amount distribution. In addition, according to this method, although the light amount distribution depends on the degree of scattering of the scattering plate 6, the reference light beam Lr is easily incident from the entire area of the light emitting plane 6a of the scattering plate 6 to each position of the hologram photosensitive material 58 with a substantially uniform light amount. In this case, it can be realized that the light beam, which is incident on each position of the hologram recording medium 55-2 obtained, reproduces the image 5-2 of the scattering plate 6 with the same brightness, and the reproduced image 5-2 of the scattering plate 6 is observed with substantially uniform brightness.

In this manner, if the hologram recording material 58 is exposed to the reference light beam Lr and the object light beam Lo, the interference fringe is generated by interference between the reference light beam Lr and the object light beam Lo, and the interference fringe of the light beams is recorded in the hologram recording material 58 as a certain pattern (in the volume hologram, as an example, a refractive index modulation pattern). Next, appropriate post processes corresponding to the type of the hologram recording material 58 are performed, so that the hologram recording medium 55-2 is obtained.

The hologram recording media 55-1 and 55-3 may be manufactured by using the same method.

Figure 4:
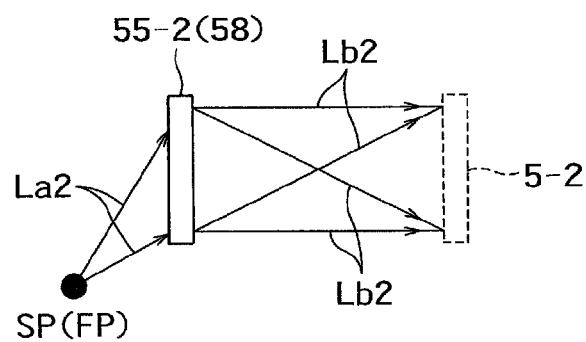
FIG. 4 is a diagram illustrating functions of the hologram recording medium manufactured by the exposing method illustrated in FIG. 3.

FIG. 4 illustrates a diffraction function (reproduction function) of the hologram recording medium 55-2 obtained through the exposing process of FIG. 3. As illustrated in FIG. 4, with respect to the hologram recording medium 55-2 formed from the hologram photosensitive material 58 of FIG. 3, the light beam having the same wavelength as that of the laser beam used for the exposing process, which propagates in the reverse direction along the optical path of the reference light beam Lr in the exposing process, satisfies the Bragg condition. In other words, as illustrated in FIG. 4, the diverging flux, which diverges from the standard point SP located with respect to the hologram recording medium 55-2 which has the same positional relationship as the relative position (refer to FIG. 3) of the focal point FP with respect to the hologram photosensitive material 58 during the exposing process and has the same wavelength as that of the reference light beam Lr during the exposing process, is diffracted as the reproduction illumination light beam La2 by the hologram recording medium 55-2, so that the reproduced image 5-2 of the scattering plate 6 is generated at a specific position with respect to the hologram recording medium 55-2 which has the same positional relationship as the relative position (refer to FIG. 3) of the scattering plate 6 with respect to the hologram photosensitive material 58 during the exposing process.

At this time, the reproduction light beam (light beam obtained by diffracting the reproduction illumination light beam La2 with the hologram recording medium 55-2) Lb2 which generates the reproduced image 5-2 of the scattering plate 6 reproduces each point of the image 5-2 of the scattering plate 6 as a light beam which propagates in the reverse direction along the optical path of the object light beam Lo which propagates from the scattering plate 6 toward the hologram photosensitive material 58 during the exposing process. In addition, as described above, as illustrated in FIG. 3, the scattered light beam Lo which emits from each position of the light emitting plane 6a of the scattering plate 6 during the exposing process is diffused (spread) so as to be incident on the substantially entire region of the hologram photosensitive material 58. In other words, the object light beam Lo from the entire region of the light emitting plane 6a of the scattering plate 6 is incident to each position on the hologram photosensitive material 58, so that information of the entire light emitting plane 6a is recorded in each position of the hologram recording medium 55-2. Therefore, each light beam constituting the diverging flux from the standard point SP which function as the reproduction illumination light beam La2 illustrated in FIG. 4 is individually incident to each position of the hologram recording medium 55-2, so that the images 5-2 of the scattering plate 6 having the same contour can be reproduced at the same position (illuminated region LZ2).

The same description can be made with respect to the hologram recording media 55-1 and 55-3.

On the other hand, the irradiation device 60 which irradiates the optical element 50 including the hologram recording media 55-1 to 55-3 with the coherent light beams as the reproduction illumination light beams La1 to La3 may be configured as follows. In the example illustrated in FIGS. 1 and 2, the irradiation device 60 includes a laser source 61a which generates a coherent light beam, a light division unit 62 which divides the coherent light beam from the laser source 61a to generate three divided light beams, optical fibers 64-1 to 64-3 which couple and transmit each divided light beam from the light division unit 62 respectively, and a scan device 65 which changes propagation direction of each divided light beam emitted from the optical fibers 64-1 to 64-3. The light division unit 62 includes three semi-transparent mirrors to divide the coherent light beam from the laser source 61 into three light beams. With respect to the optical fibers 64-1 to 64-3, a photocoupling unit CI is disposed to the incidence end thereof, and a photocoupling unit CO is disposed to the emitting end thereof. The scan device 65 changes the propagation direction of each divided light beam in time, so that the propagation direction of each divided light beam is not a constant direction but various directions. As a result, each divided light beam of which the propagation direction is changed by the scan device 65 is allowed to scan the incidence plane of the corresponding hologram recording media 55-1 to 55-3 of the optical element 50, as each of the reproduction illumination light beams La1 to La3.

Figure 5:
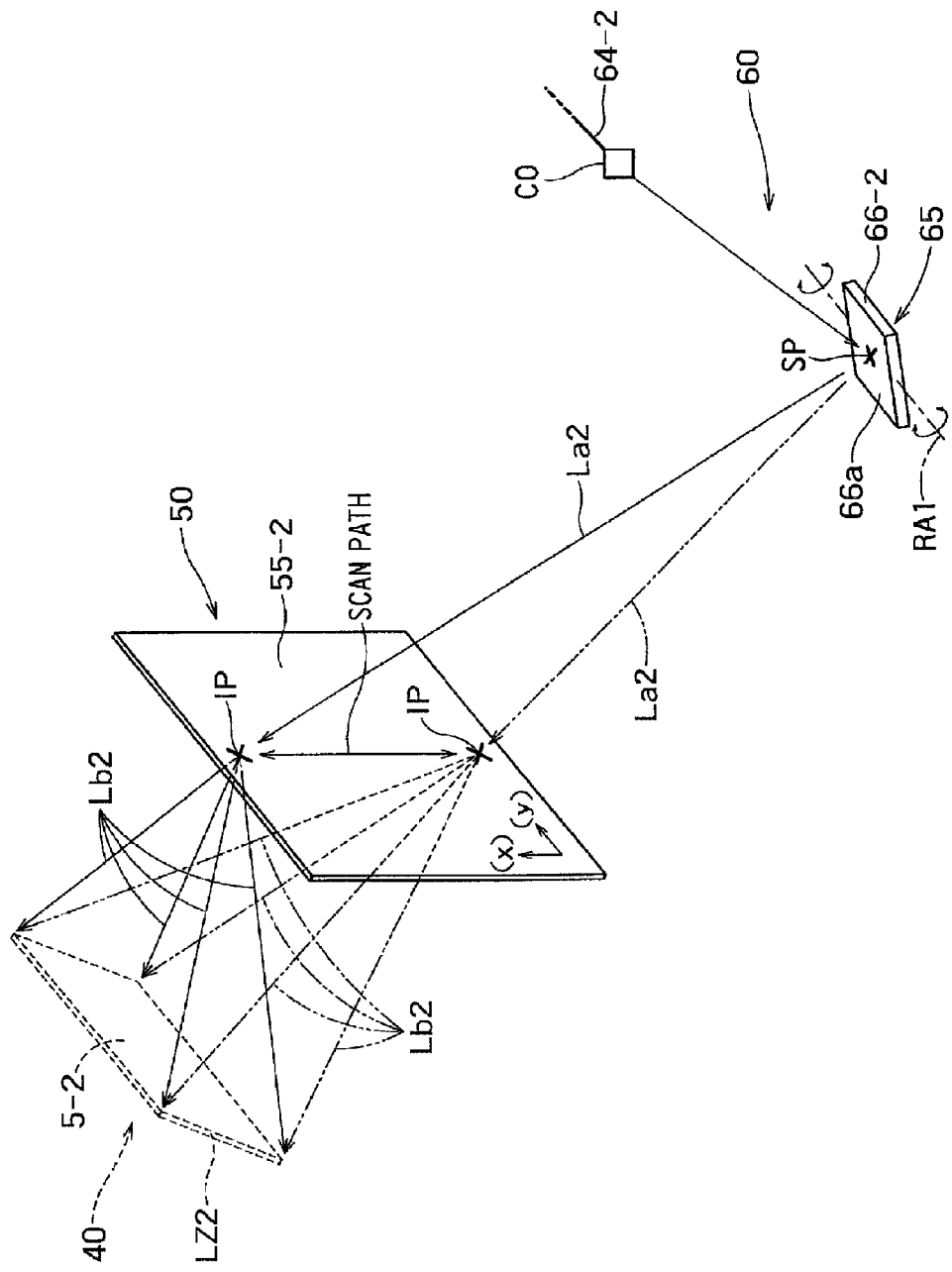
FIG. 5 is a perspective diagram illustrating functions of the illumination device illustrated in FIG. 1.

Particularly, in the example illustrated in FIG. 2, the scan device 65 includes three reflection devices 66-1 to 66-3 having the reflection plane 66a which can rotate about one axial line RA1. More specifically, each of the reflection devices 66-1 to 66-3 is configured as a mirror device having a mirror as the reflection plane 66a which can rotate about one axial line RA1. Herein, the mirror device 66-2 will be described. As illustrated in FIGS. 2 and 5, the mirror device 66-2 changes the orientation of the mirror 66a to change the propagation direction of the divided light beam from the emitting end (photocoupling unit CO) of the optical fiber 64-2. At this time, as illustrated in FIG. 2, the mirror device 66-2 substantially receives the divided light beam from the emitting end of the optical fiber 64-2 at the standard point SP. Therefore, the divided light beam of which the propagation direction is finally adjusted by the mirror device 66-2 can be incident on the hologram recording medium 55-2 of the optical element 50 as the reproduction illumination light beam La2 (refer to FIG. 4) which can constitute one light beam of the diverging flux from the standard point SP. As a result, the divided light beam from the irradiation device 60 is allowed to scan the hologram recording medium 55-2, and the divided light beam which is incident to each position of the hologram recording medium 55-2 is allowed to reproduce the image 5-2 of the scattering plate 6 having the same contour at the same position (illuminated region LZ2).

Note that, the mirror device 66-2 illustrated in FIG. 2 is configured to rotate the mirror 66a along one axial line RA1. FIG. 5 is a perspective diagram illustrating a configuration of the illumination device 40 illustrated in FIG. 2. In the example illustrated in FIG. 5, the rotation axial line RA1 of the mirror 66a is extended in parallel to the Y axis of the XY coordinate system defined on the plate plane of the hologram recording medium 55-2 (that is, the XY coordinate system where the XY plane is parallel to the plate plane of the hologram recording medium 55-2). Then, since the mirror 66a rotates about the axial line RA1 which is parallel to the Y axis of the XY coordinate system defined on the plate plane of the hologram recording medium 55-2, the incidence point IP of the divided light beam from the irradiation device 60 to the optical element 50 is reciprocally moved in the direction which is parallel to the X axis of the XY coordinate system defined on the plate plane of the hologram recording medium 55-2. In other words, in the example illustrated in FIG. 5, the irradiation device 60 irradiates the optical element 50 with the divided light beam so that the divided light beam is allowed to scan the hologram recording medium 55-2 along the straight line path.

The same description can be made with respect to the mirror devices 66-1 and 66-3.

Note that, as a practical problem, there is a case where the hologram recording material 58 is contracted during the manufacturing of the hologram recording media 55-1 to 55-3. In this case, by taking into consideration the shrinkage of the hologram recording material 58, it is preferable that the recording angles of the coherent light beams, which is irradiated on the optical element 50 by the irradiation device 60, is adjusted. The wavelength of the coherent light beam generated by the coherent light source 61a needs not to be strictly equal to the wavelength of the light beam used in the exposing process (recording process) of FIG. 3, but the wavelengths thereof may be substantially equal to each other.

In addition, for the same reason, although the propagation directions of the light beams incident on the hologram recording media 55-1 to 55-3 of the optical element 50 are not taken to be strictly equal to the one light beam constituting the diverging flux from the standard point SP, the images 5-1 to 5-3 can be reproduced in the illuminated regions LZ1 to LZ3. Actually, in the example illustrated in FIGS. 2 and 5, the mirror (reflection plane) 66a of the mirror device 66-2 constituting the scan device 65 is necessarily shifted from the rotation axial line RA1. Therefore, in the case where the mirror 66a is allowed to rotate about the rotation axial line RA1 which does not pass through the standard point SP, the light beam incident on the hologram recording medium 55-2 may not be one light beam constituting the diverging flux from the standard point SP. However, in a practical case, the coherent light beam as the reproduction illumination light beam La1 from the irradiation device 60 having the illustrated configuration is allowed to substantially overlappedly reproduce the image 5-2 in the illuminated region LZ2. The same description can be made with respect to the hologram recording media 55-1 and 55-3.

Functions and Effects of Basic Embodiment

Next, the functions of the illumination device 40, the projection device 20, and the projection-type video display device 10 having the configuration described hereinbefore will be described.

First, the irradiation device 60 irradiates the optical element 50 with the coherent light beams as the reproduction illumination light beams La1 to La3 so as to allow the coherent light beams as the reproduction illumination light beams La1 to La3 to scan the corresponding hologram recording media 55-1 to 55-3 of the optical element 50. More specifically, the laser source 61a generates a coherent light beam having a specific wavelength which propagates in a constant direction, the light division unit 62 divides the coherent light beam into three light beams, and each divided light beam is transmitted by the corresponding optical fibers 64-1 to 64-3. The propagation direction of each divided light beam emitted from the optical fibers 64-1 to 64-3 can be changed by the scan device 65. With respect to the hologram recording medium 55-1, the scan device 65 allows the divided light beam which is a coherent light beam having a specific wavelength as the reproduction illumination light beam La1 to be incident to each position of the hologram recording medium 55-1 with an incident angle satisfying the Bragg Condition of the position. As a result, due to the diffraction of the hologram recording medium 55-1, the coherent light beam incident on each position overlappedly reproduces the image 5-1 of the scattering plate 6 in the illuminated region LZ1. In other words, the coherent light beam incident from the irradiation device 60 to each position of the hologram recording medium 55-1 is diffused (spread) by the optical element 50 to be incident to the entire area of the illuminated region LZ1. The same description can be made with respect to the hologram recording media 55-2 and 55-3. In this manner, the irradiation device 60 irradiates the illuminated regions LZ1 to LZ3 with the coherent light beams as the corresponding reproduction illumination light beams La1 to La3.

As illustrated in FIG. 1, in the projection device 20, the spatial light modulators 30-1 to 30-3 are disposed at the positions which overlap the illuminated regions LZ1 to LZ3 of the illumination device 40. Therefore, with respect to the spatial light modulators 30-1 to 30-3, the planes thereof are illuminated by the illumination device 40, and each pixel is allowed to selectively transmit the coherent light beam, so that three videos are formed. Each video is projected on the corresponding screens 15-1 to 15-3 by the corresponding projection optical systems 25-1 to 25-3. The coherent light beams projected on the screens 15-1 to 15-3 are diffused and recognized as videos by an observer. However, at this time, the coherent light beams projected on the screen interfere with each other due to the diffusion, so that speckles occur.

However, according to the illumination device 40 of the basic embodiment described herein, as described below, it is possible to very effectively allow the speckles to be inconspicuous. Since the speckles can be allowed to be inconspicuous according to the same principle with respect to the illuminated regions LZ1 to LZ3, the description hereinafter is made on only the illuminated region LZ1.

The Non Patent Literature 1 described above discloses that multiplexing of parameters of polarization, phase, angle, and time and increasing of modes are effective to allow the speckles to be inconspicuous. Herein, the modes denote speckle patterns having no correlation therebetween. For example, in the case where the coherent light beams from a plurality of the laser sources are projected on the same screen in different directions, the number of the modes is equal to the number of the laser sources exist. In addition, in the case where the coherent light beam from the same laser source is projected on the screen in different directions in a time division manner, the number of the modes is equal to the number of changing of the incident direction of the coherent light beam within a time which may not be resolved by human eyes. Then, it is considered that, in the case where a plurality of the modes exist, the interference patterns of light beams overlap each other with no correlation to be averaged, so that the speckles observed with observer's eyes are inconspicuous.

In the irradiation device 60 described above, the coherent light beam is irradiated on the optical element 50 so as to scan the hologram recording medium 554. In addition, with respect to the coherent light beams incident from the irradiation device 60 to the positions of the hologram recording medium 55-1, although the entire region of the same illuminated region LZ1 is illuminated with the coherent light beam, the illumination directions of the coherent light beams which are illuminated on the illuminated region LZ1 are mutually different. Then, since the position on the hologram recording medium 55-1 where the coherent light beam is incident is changed in time, the incident direction of the coherent light beam incident on the illuminated region LZ1 is also changed in time.

If the illuminated region LZ1 is considered as a standard, although the coherent light beam is consistently incident to the positions inside the illuminated region LZ1, the incident direction is always continuously changed as indicated by arrow A1 in FIG. 1. As a result, the light beam constituting each pixel of the video formed by the transmitted light beam of the spatial light modulator 30-1 is projected on specific position of the screen 15-1 while the optical path is changed in time as indicated by arrow A2 in FIG. 1.

Note that, the coherent light beam is allowed to continuously scan the hologram recording medium 55-1. Accordingly, the incident direction of the coherent light beam incident from the irradiation device 60 to the illuminated region LZ1 is also continuously changed, and the incident direction of the coherent light beam incident from the projection device 20 to the screen 15-1 is also continuously changed. Here, if the incident direction of the coherent light beam incident from the projection device 20 to the screen 15-1 is changed by only a small amount (for example, several deci-degrees), the pattern of speckles occurring on the screen 15-1 is also greatly changed, so that speckle patterns having no correlation overlap. In addition, the frequency of the scan device 65 such as a MEMS mirror or a polygon mirror which is actually commercially available is typically several hundred Hz or more, and in some cases, the frequency of the scan device 65 may be several tens of thousands of Hz.

Hereinbefore, according to the basic embodiment described above, the incident direction of the coherent light beam is changed in time at each position of each of the screens 15-1 to 15-3 displaying videos, and the speed of the change thereof is such a speed that the change may not be distinguished by human eyes, and thus, the multiplexed scattering patterns of the coherent light beams having no correlation are observed by human eyes. Therefore, the speckles occurring corresponding to the scattering patterns overlap to be averaged and are observed by an observer. Therefore, with respect to the observer who observes the videos displayed on the screens 15-1 to 15-3, the speckles are very effectively allowed to be inconspicuous.

Note that, with respect to the speckles observed by human in the related art, the speckles of the screen side may occur due to the scattering of the coherent light beams on the screens 15-1 to 15-3, and the speckles of the projection device side may occur due to the scattering of the coherent light beams before projection on the screens. The speckle pattern occurring at the projection device side is projected on the screens 15-1 to 15-3 through the spatial light modulators 30-1 to 30-3, so that the speckle pattern can be recognized by the observer. However, according to the basic embodiment described above, with respect to the hologram recording medium 55-1, the coherent light beam is allowed to continuously scan the hologram recording medium 55-1, and the coherent light beam which is incident to each position of the hologram recording medium 55-1 is illuminated on the entire region of the illuminated region LZ1 which the spatial light modulator 30-1 overlaps. In other words, the hologram recording medium 55-1 forms a new wavefront differently from the existing wavefront which forms the speckle pattern, and illuminates complicatedly and uniformly the illuminated region LZ1 and the screen 15-1 through the spatial light modulator 30-1. Due to the formation of the new wavefront by the hologram recording medium 55-1, the speckle pattern occurring at the projection device side may not be visually perceived. The same description can be made with respect to the hologram recording media 55-1 and 55-3.

The Non Patent Literature 1 described above discloses a method of using a numerical value called speckle contrast as a parameter indicating a degree of speckles occurring on the screen. When a video of a test pattern which needs to have an originally uniform luminance distribution is displayed, the video on the screen actually have a variation in luminance. The speckle contrast is a quantity defined as a value obtained by dividing a standard deviation of the variation in luminance by an average value of luminance. As the value of the speckle contrast is increased, the degree of occurrence of speckles on the screen is increased, and thus, a punctate luminance irregularity pattern is more remarkably represented to an observer.

Hereinafter, the speckle contrast on the screen 15-1 will be described. In the projection-type video display device 10 according to the basic embodiment described with reference to FIGS. 1 to 5, the speckle contrast on the screen 15-1 is measured to be 3.0% (Condition 1). In addition, in the case where, instead of the reflection-type volume hologram, a relief type hologram which is a computer generated hologram (CGH) having a convex-concave shape designed by using a computer so as to generate an image 5-1 of the scattering plate 6-1 when a specific reproduction illumination light beam is received is used as the optical element 50 described above, the speckle contrast is measured to be 3.7% (Condition 2). In the application of HDTV (high definition TV) video display, although a criterion that the speckle contrast is equal to or less than 6.0% is set (for example, refer to WO/2001/081996) as a level that an observer may not almost recognize the luminance irregularity pattern through visual observation, the basic embodiment described above satisfies the criterion. In addition, actually, in visual observation, luminance irregularity (brightness irregularity) to a degree that it can be visually perceived does not occur.

On the other hand, in the case where the laser beam from the laser source is shaped to be in the parallel light flux and is incident on the spatial light modulator 30-1, that is, in the case where the coherent light beam from the laser source 61a as the parallel light flux is incident on the spatial light modulator 30-1 of the projection-type video display device 10 illustrated in FIG. 1 without use of the scan device 65 and the optical element 50, the speckle contrast becomes 20.7% (Condition 3). Under the condition, punctate luminance irregularity patterns are very conspicuously observed through visual observation.

In addition, in the case where the light source 61a is replaced with a green LED (incoherent light source) and the light beam from the LED light source is incident on the spatial light modulator 30-1, that is, in the case where the incoherent light beam from the LED light source as the parallel light flux is incident on the spatial light modulator 30-1 of the projection-type video display device 10 illustrated in FIG. 1 without use of the scan device 65 and the optical element 50, the speckle contrast becomes 4.0% (Condition 4). Under the condition, luminance irregularity (brightness irregularity) to a degree that it can be perceived through visual observation does not occur.

The results of Conditions 1 and 2 are much better than the result of Condition 3, and the results of Conditions 1 and 2 are better than the measurement result of Condition 4. As described above, the problem of occurrence of speckles is practically an intrinsic problem occurring in the case of using a coherent light source such as a laser source, and thus, the problem needs not be considered in the case of an apparatus using an incoherent light source such as an LED. In addition, in comparison with Condition 4, in Conditions 1 and 2, the optical element 50 which may cause occurrence of speckles is added. In terms of this point, it is considered that it is possible to sufficiently cope with the speckle defect according to Conditions 1 and 2.

In addition, according to the basic embodiment described above, the following advantages can be obtained.

According to the basic embodiment described above, the optical element 50 for allowing the speckles to be inconspicuous may also function as an optical member for shaping and adjusting the beam shape of the coherent light beam irradiated from the irradiation device 60. Therefore, it is possible to miniaturize and simplify the optical system.

In addition, according to the basic embodiment described above, the coherent light beam from the laser source 61a is used to generate the divided light beams and the optical fibers 64-1 to 64-3 are used to transmit the divided light beams as the coherent light beams, so that it is possible to reduce a loss in light amount and reduce restriction of arrangement of the optical system.

In addition, according to the basic embodiment described above, since the videos corresponding to the screens can be simultaneously displayed on the three screens 15-1 to 15-3, it is possible to increase an amount of display information in comparison with the projection-type video display device displaying video on only one screen. In addition, it is possible to perform panorama display where one video is displayed over the three screens 15-1 to 15-3 in a seamless manner. Therefore, the projection-type video display device according to the basic embodiment can be used as a display having a high sense of realization.

In addition, according to the basic embodiment described above, the coherent light beam as the reproduction illumination light beam La1 which is incident to each position of the hologram recording medium 55-1 is allowed to generate the image 5-1 of the scattering plate 6 at the mutually same position, and the spatial light modulator 30-1 is disposed to overlap the image 5-1. The same description can be made with respect to the hologram recording media 55-2 and 55-3. Therefore, the light beams diffracted by the hologram recording media 55-1 to 55-3 can be used for video formation with high efficiency, so that use efficiency of the light from the light source 61a is excellent.

Note that, the scan device 65 may be configured to change the propagation directions of the divided light beams by changing the directions of the emitting ends (photocoupling units CO) of the optical fibers 64-1 to 64-3. In this case, the mirror devices 66-1 to 66-3 are unnecessary.

Modification of Basic Embodiment

The basic embodiment described above based on one specific example exemplified in FIGS. 1 to 5 can be modified in various forms.

Hereinafter, modified examples will be described with reference to the drawings. In the drawings used for the description hereinafter, the components corresponding to those of the basic embodiments described above are denoted by the same reference numerals, and the description thereof is not provided.

(Projection Device)

In the basic embodiment, the example where each of the spatial light modulators 30-1 to 30-3 is disposed at the position which overlaps the corresponding illuminated regions LZ-1 to LZ-3 is described. However, each of the spatial light modulators 30-1 to 30-3 may not be disposed at the position which strictly overlaps the corresponding illuminated regions LZ-1 to LZ-3. For example, in the configuration of FIG. 1, the spatial light modulator 30-1 may be disposed to the optical element 50 side rather than the illuminated region LZ-1, and the spatial light modulator 30-1 may be disposed to the projection optical system 25-1 side rather than the illuminated region LZ-1. The same description can be made with respect to the spatial light modulators 30-2 and 30-3. In other words, the hologram recording media 55-1 to 55-3 and the spatial light modulators 30-1 to 30-3 may be disposed so that the reproduction illumination light beam, which is incident to each position of each of the hologram recording media 55-1 to 55-3 to be diffused, overlappedly illuminates on the corresponding spatial light modulators 30-1 to 30-3.

(First Modified Example of Irradiation Device)

This modified example is different from the basic embodiment described above in terms of only the configuration of the irradiation device 60.

Figure 6:
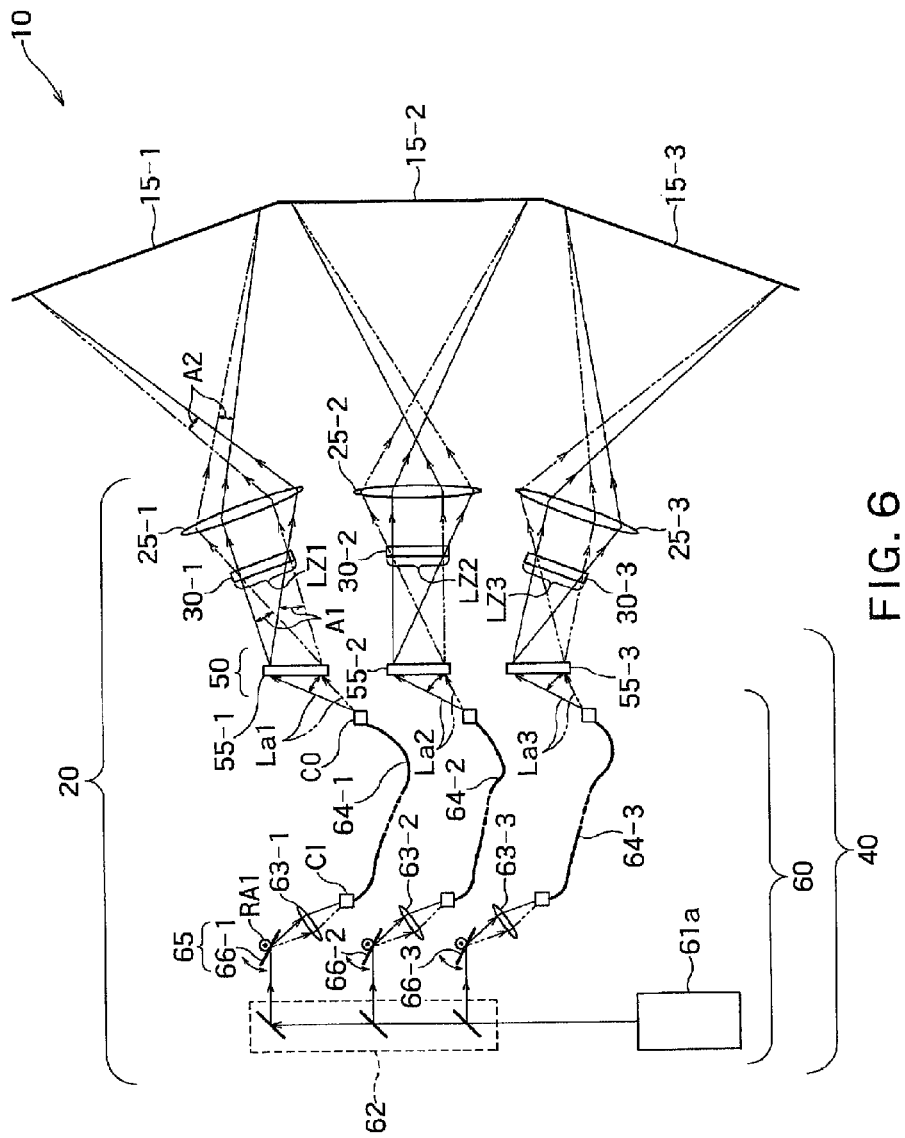
FIG. 6 is a schematic diagram illustrating configurations of an illumination device, a projection device, and a projection-type video display device according to a first modified example of the basic embodiment as a diagram corresponding to FIG. 1.

FIG. 6 is a schematic diagram illustrating configurations of an illumination device, a projection device, and a projection-type video display device according to a first modified example of the basic embodiment as a diagram corresponding to FIG. 1. As illustrated in FIG. 6, the irradiation device 60 includes a laser source 61a which generates a coherent light beam, a light division unit 62 which divides the coherent light beam from the laser source 61 to generate three divided light beams, a scan device 65 which changes propagation direction of each divided light beam from the light division unit 62, converging lenses 63-1 to 63-3 which allow the divided light beams from the scan device 65 to converge, optical fibers 64-1 to 64-3 which couple and transmit each converging divided light beam and irradiate the optical element 50 with each converging divided light beam as each of the reproduction illumination light beams La1 to La3 respectively.

With respect to the optical fibers 64-1 to 64-3, a photocoupling unit CI is disposed to the incidence end thereof, and a photocoupling unit CO is disposed to the emitting end thereof. The converging lens 63-1 allows the divided light beam of which the propagation direction is changed to converge to the photocoupling unit CI of the corresponding optical fiber 64-1. The converging lenses 63-2 and 63-3 have the similar function. The scan device 65 changes the propagation direction of each divided light beam in time, so that the propagation direction of each divided light beam is not a constant direction but various directions. As a result, the divided light beams of which the propagation directions are changed by the scan device 65 as the reproduction illumination light beams La1 to La3 are allowed to scan the incidence planes of the corresponding hologram recording media 55-1 to 55-3 of the optical element 50. In other words, each of the reproduction illumination light beams La1 to La3 constitutes the diverging flux from the emitting end of the corresponding optical fibers 64-1 to 64-3, and each diverging flux is incident on the corresponding hologram recording media 55-1 to 55-3.

According to the modified example, it is possible to obtain the same effects as those of the basic embodiment described above.

(Second Modified Example of Irradiation Device)

This modified example is also different from the basic embodiment described above in terms of only the configuration of the irradiation device 60.

Figure 7:
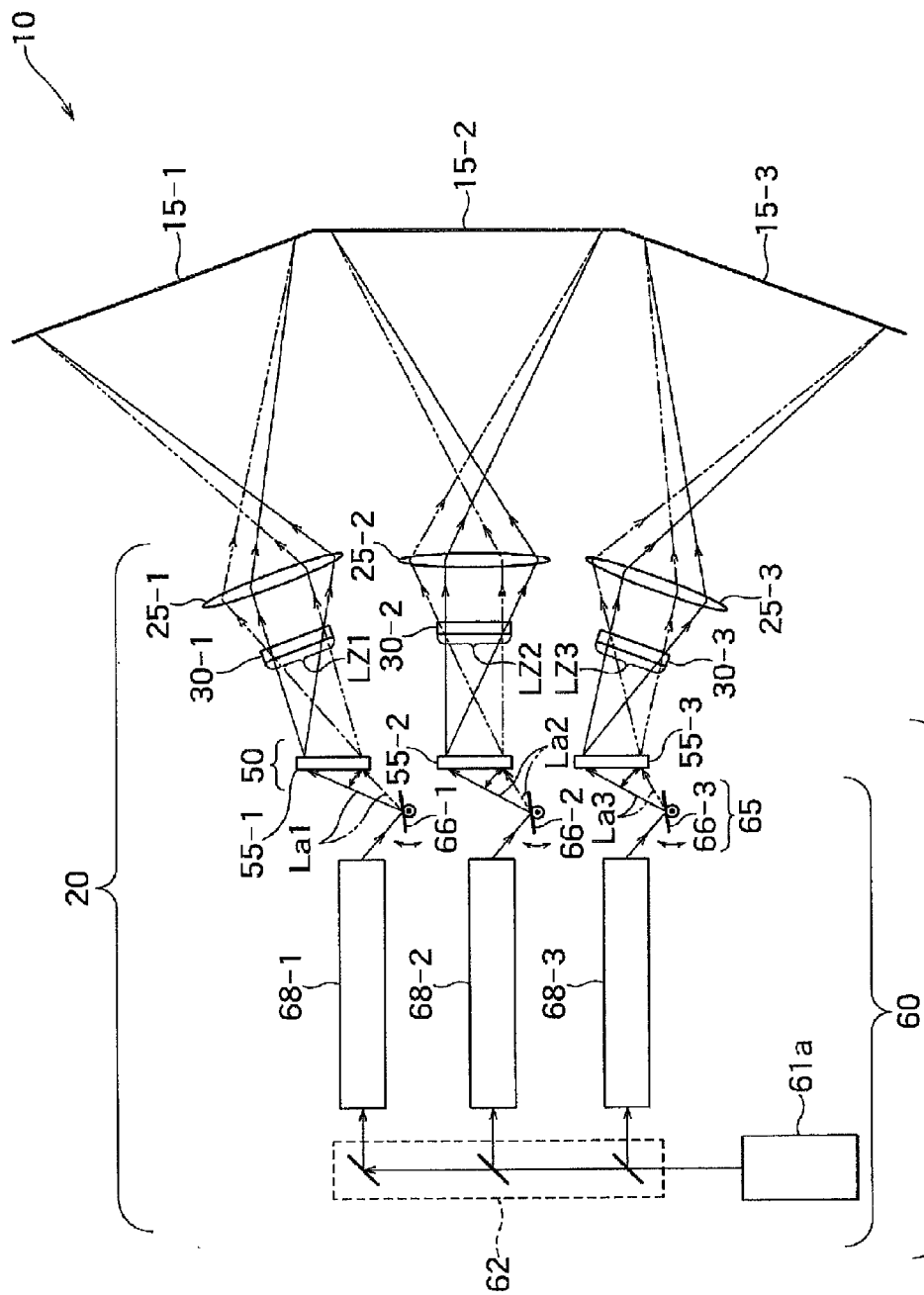
FIG. 7 is a schematic diagram illustrating configurations of an illumination device, a projection device, and a projection-type video display device according to a second modified example of the basic embodiment as a diagram corresponding to FIG. 1.

FIG. 7 is a schematic diagram illustrating configurations of an illumination device, a projection device, and a projection-type video display device according to a second modified example of the basic embodiment as a diagram corresponding to FIG. 1.

As illustrated in FIG. 7, the irradiation device 60 includes a laser source 61a which generates a coherent light beam, a light division unit 62 which divides the coherent light beam from the laser source 61a to generate three divided light beams, mirror optical systems 68-1 to 68-3 which transmit each divided light beam from the light division unit 62 respectively, and a scan device 65 which changes the propagation direction of each divided light beam incident from the mirror optical systems 68-1 to 68-3.

The mirror optical systems 68-1 to 68-3 are configured with a plurality of mirrors so that the incident light beams are transmitted due to reflection of the mirrors. The scan device 65 changes the propagation direction of each divided light beam in time, so that the propagation direction of each divided light beam is not a constant direction but various directions. As a result, each divided light beam of which the propagation direction is changed by the scan device 65 as each of the reproduction illumination light beams La1 to La3 is allowed to scan the incidence plane of the corresponding hologram recording media 55-1 to 55-3 of the optical element 50.

According to the modified example, it is possible to obtain the same effects as those of the basic embodiment described above.

(Third Modified Example of Irradiation Device)

This modified example is also different from the basic embodiment described above in terms of only the configuration of the irradiation device 60.

Figure 8:
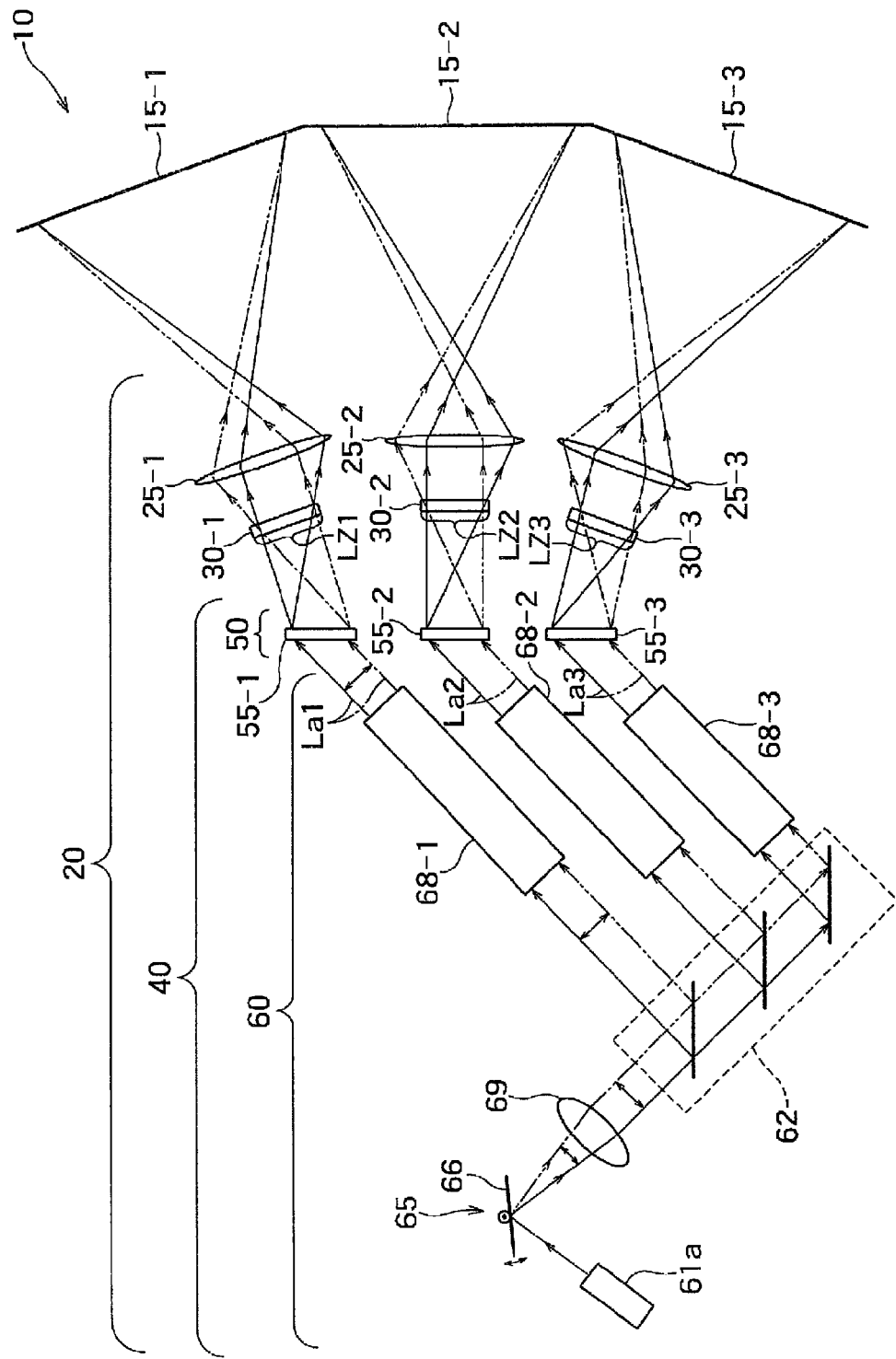
FIG. 8 is a schematic diagram illustrating configurations of an illumination device, a projection device, and a projection-type video display device according to a third modified example of the basic embodiment as a diagram corresponding to FIG. 1.

FIG. 8 is a schematic diagram illustrating configurations of an illumination device, a projection device, and a projection-type video display device according to a third modified example of the basic embodiment as a diagram corresponding to FIG. 1.

As illustrated in FIG. 8, the irradiation device 60 includes a laser source 61*a* which generates a coherent light beam, a scan device 65 which changes a propagation direction of the coherent light beam from the laser source 61*a*, a collimation optical system 69 which collimates the coherent light beam from the scan device 65 as a parallel light beam, a light division unit 62 which divides the collimated coherent light beam as a parallel light beam into three divided light beams, and mirror optical systems 68-1 to 68-3 which transmit each divided light beam from the light division unit 62 and irradiate the optical element 50 with each divided light beam as each of the reproduction illumination light beams La1 to La3 respectively.

The scan device 65 changes the propagation direction of the coherent light beam in time, so that the propagation direction of the coherent light beam is not a constant direction but various directions. The coherent light beam of which the propagation direction is changed in time is collimated, and the position where the collimated light beam is incident on a semi-transparent mirror constituting the light division unit 62 is changed in time. Therefore, the positions where the three divided light beams divided by the light division unit 62 are incident on the mirror optical systems 68-1 to 68-3 are changed in time. As a result, each divided light beam from the mirror optical systems 68-1 to 68-3 is allowed to scan the incidence plane of the corresponding hologram recording media 55-1 to 55-3 of the optical element 50 as each of the reproduction illumination light beams La1 to La3. In other words, each of the reproduction illumination light beams La1 to La3 constitutes the parallel light flux, and each parallel light flux is incident on the corresponding hologram recording media.

According to the modified example, it is possible to obtain the same effects as those of the basic embodiment described above.

(Spatial light modulator, Projection Optical System, and Screen)

According to the embodiments described above, the speckles are effectively allowed to be inconspicuous. However, the functions and effects are obtained mainly from the illumination device 40. Then, in the case where the illumination device 40 is configured as a combination of various existing spatial light modulators, projection optical systems, screens, and the like, the speckles are effectively allowed to be inconspicuous. Due to this point, the spatial light modulators, the projection optical systems, and the screens are not limited to the exemplified ones, but various existing members, parts, apparatuses, and the like may be used.

(Projection-Type Video Display Device)

In addition, although the example where the hologram recording media 55-1 to 55-3 are manufactured by using the planar scattering plate 6 having a shape corresponding to the incidence planes of the spatial light modulators 30-1 to 30-3 and by an interference exposing method is illustrated, the present invention is not limited thereto. The hologram recording media 55-1 to 55-3 may be manufactured by using a scattering plate having some pattern and by an interference exposing method. In this case, the image of the scattering plate having some pattern is reproduced by the hologram recording media 55-1 to 55-3. In other words, the optical element 50 (hologram recording media 55-1 to 55-3) illuminates the illuminated regions LZ1 to LZ3 having some patterns. In the case where the optical element 50 is used, the spatial light modulators 30-1 to 30-3 and the projection optical systems 25-1 to 25-3 may be not provided from the basic embodiment described above, and the screens 15-1 to 15-3 are disposed at the positions which overlap the illuminated regions LZ1 to LZ3, so that some patterns recorded in the hologram recording media 55-1 to 55-3 can be displayed on the screens 15-1 to 15-3. In this display device, the irradiation device 60 irradiates the optical element 50 with the coherent light beams so that the coherent light beams are allowed to scan the hologram recording media 55-1 to 55-3, so that it is possible to allow the speckles to be inconspicuous on the screens 15-1 to 15-3.

(Irradiation Device)

Figure 9:
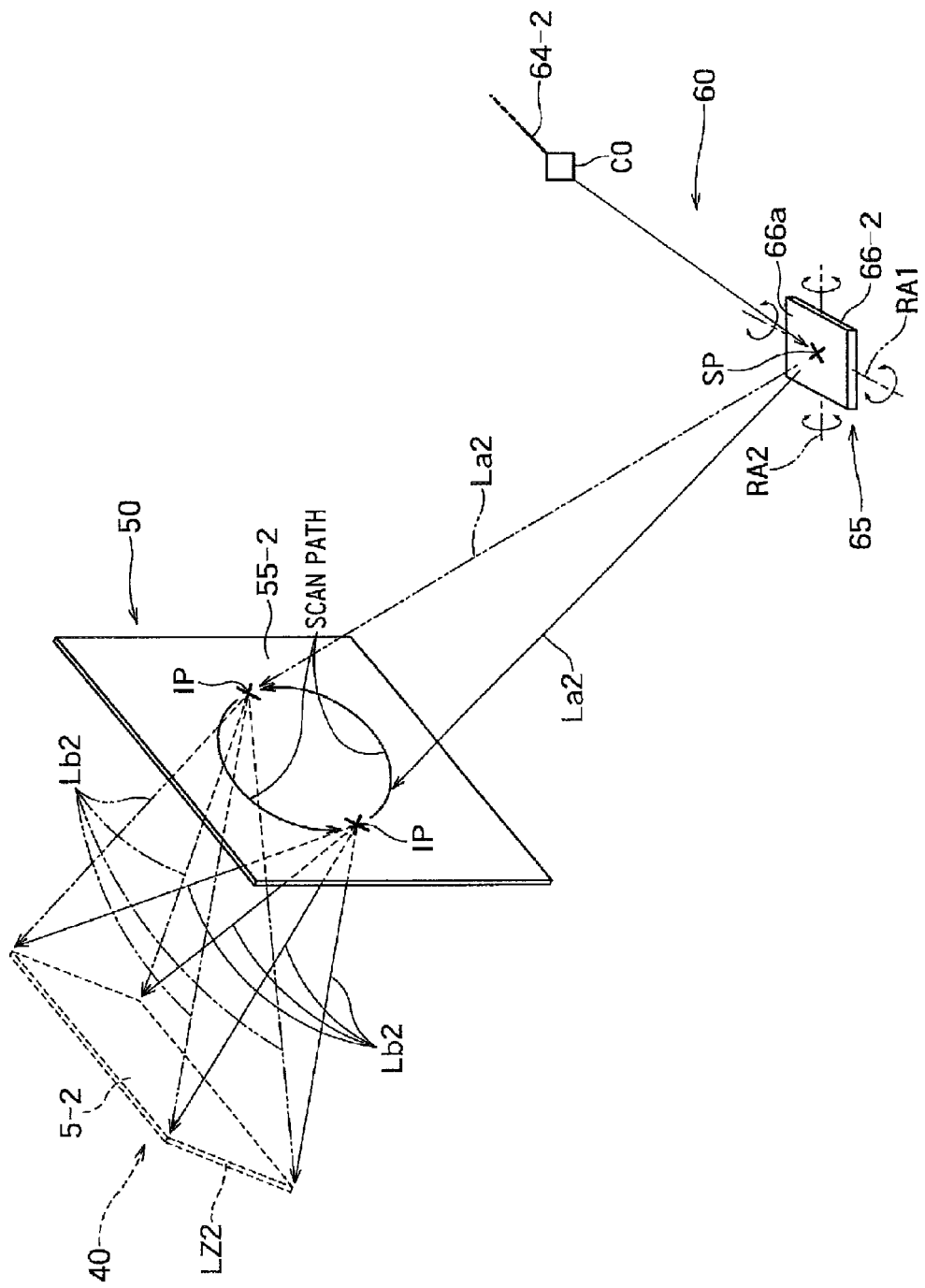
FIG. 9 is a perspective diagram illustrating a modified example of the irradiation device and functions thereof as a diagram corresponding to FIG. 5.

In the embodiment described above, an example where the irradiation device 60 includes the laser source 61*a* and the scan device 65 is illustrated. Although the scan device 65 which is configured with one-axis-rotation type mirror devices 66-1 to 66-3 which change the propagation direction of the coherent light beam by reflection is exemplified, the scan device 65 is not limited thereto. Herein, the mirror device 66-2 will be described. As illustrated in FIG. 9, the scan device 65 may be configured so that the mirror (reflection plane 66*a*) of the mirror device 66-2 can rotate about the first rotation axial line RA1 as well as about the second rotation axial line RA2 intersecting the first rotation axial line RA1. In the example illustrated in FIG. 9, the second rotation axial line RA2 of the mirror 66*a* is perpendicular to the first rotation axial line RA1 which is extended in parallel to the Y axis of the XY coordinate system defined on the plate plane of the hologram recording medium 55-2. Then, since the mirror 66*a* can rotate about both of the first axial line RA1 and the second axial line RA2, the incidence point IP of the coherent light beam from the irradiation device 60 incident on the optical element 50 can be moved on the plate plane of the hologram recording medium 55-2 in two-dimensional directions. Therefore, as an example, as illustrated in FIG. 9, the incidence point IP of the coherent light beam incident on the optical element 50 may also be configured to be moved along a circumference. The mirror devices 66-1 and 66-3 may be configured in a similar manner.

In addition, the scan device 65 may include four or more mirror devices. In this case, for example, although the mirror 66*a* of the mirror device 66-2 can rotate about only a single axial line, the incidence point IP of the coherent light beam from the irradiation device 60 incident on the optical element 50 can be moved on the plate plane of the hologram recording medium 55-2 in two-dimensional directions by other mirror devices. The mirror devices 66-1 and 66-3 may be configured in a similar manner.

In addition, as a specific example of the mirror devices 66-1 to 66-3 included in the scan device 65, there are a MEMS mirror, a polygonal mirror, and the like.

In addition, the scan device 65 may be configured to include a device except a reflection device (for example, the mirror devices 66-1 to 66-3 described above) which changes the propagation direction of the coherent light beam through reflection. For example, the scan device 65 may include a refraction prism or lens or the like.

Essentially, the scan device 65 is not a necessary component. The light source 61*a* of the irradiation device 60 is configured so that the light source can be displaced (moved, oscillated, and rotated) with respect to the optical element 50 and so that the reproduction illumination light beams La1 to La3 based on the coherent light beams irradiated from the light source 61*a* are allowed to scan the corresponding hologram recording media 55-1 to 55-3 according to the displacement of the light source 61*a* with respect to the optical element.

In addition, although the description hereinbefore is made under the presumption that the light source 61*a* of the irradiation device 60 oscillates a laser beam which is shaped as a linear light beam, the preset invention is not limited thereto. Particularly, in the embodiment described above, the coherent light beam as the reproduction illumination light beam La1 irradiated to each position of the optical element 50 is shaped by the optical element 50 as a light flux which is incident on the entire region of the illuminated region LZ1. The same description can be made with respect to the reproduction illumination light beams La1 and La3. Therefore, although the coherent light beams as the reproduction illumination light beams La1 to La3 irradiated from the light source 61*a* of the irradiation device 60 to the optical element 50 are not accurately shaped, no problem occurs. For this reason, the coherent light beam generated from the light source 61*a* may be a diverging light beam. In addition, the shape of cross section of the coherent light beam generated from the light source 61*a* may an ellipse or the like instead of a circle. In addition, the transverse mode of the coherent light beam generated from the light source 61*a* may be a multi-mode.

In addition, in the case where the light source 61*a* generates the diverging flux, when the coherent light beams as the reproduction illumination light beams La1 to La3 are incident on the hologram recording media 55-1 to 55-3 of the optical element 50, each of the light beams is incident on not a spot but a region having somewhat area. In this case, the light beams which are diffracted by the hologram recording media 55-1 to 55-3 to be incident to the positions of the corresponding illuminated regions LZ1 to LZ3 are multiplexed in terms of angle. In other words, in each instant, the coherent light beams are incident from the directions of certain angle ranges to the positions of the illuminated regions LZ1 to LZ3. Due to the multiplexing in terms of angle, it is possible to more effectively allow the speckles to be inconspicuous.

Figure 10:
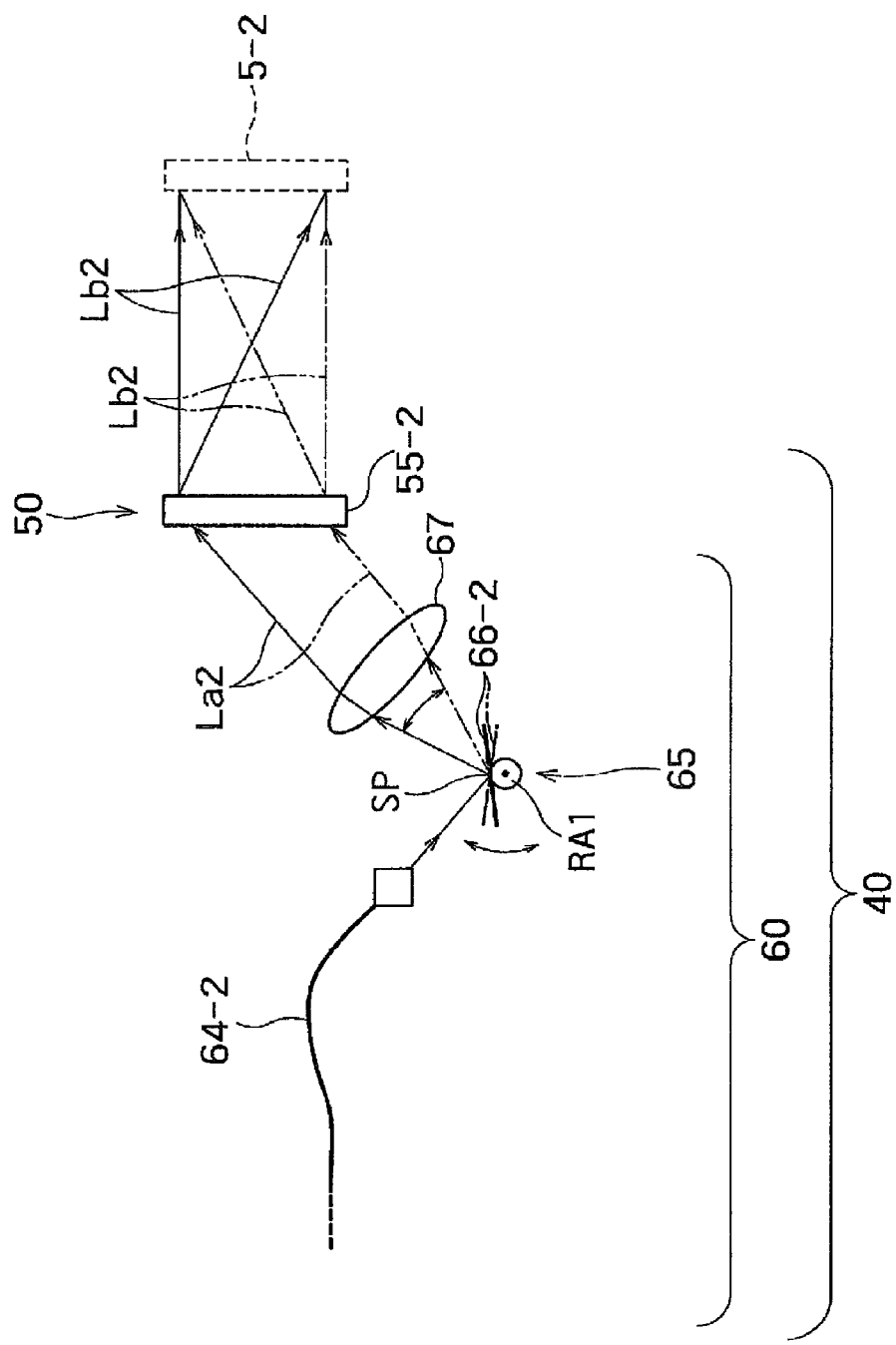
FIG. 10 is a perspective diagram illustrating another modified example of the irradiation device and functions thereof as a diagram corresponding to FIG. 2.

In addition, in the embodiment described above, although the example where the irradiation device 60 allows the coherent light beam to be incident on the optical element 50 so as to trace the optical path of the one light beam constituting the diverging flux is described, the present invention is not limited thereto. For example, in the above embodiment, as illustrated in FIG. 10, the scan device 65 may be configured to further include a collection lens (parallel light generation unit) 67 disposed at the lower stream side of the mirror device 66-2 along the optical path of the coherent light beam. In this case, the light beam from the mirror device 66-2, which propagates along the optical path of the light beam constituting the diverging flux, is allowed by the collection lens 67 to become the light beam which propagates in a certain direction. In other words, the irradiation device 60 allows the coherent light beam as the reproduction illumination light beam La1 to be incident on the optical element 50 so as to trace the optical path of the light beam constituting the parallel light flux. In this example, in the exposing process during the manufacturing of the hologram recording medium 55-2, instead of the converging light flux described above, the parallel light flux is used as the reference light beam Lr. The hologram recording medium 55-2 can be more simply manufactured and replicated.

Similarly, with respect to the mirror devices 66-1 and 66-3, the collection lens 67 may be disposed at the downstream side. Similarly, in the second modified example of the irradiation device illustrated in FIG. 7, the scan device 65 may further include collection lenses which are disposed at the downstream sides of the mirror devices 66-1 to 66-3 along the optical paths of the coherent light beams.

In the embodiment described above, the example where the irradiation device 60 includes only one laser source 61*a* is described. However, the present invention is not limited thereto. For example, the irradiation device 60 may include a plurality of the light sources which oscillate light beams having the same wavelength range. In this case, the illumination device 40 can illuminate the illuminated regions LZ1 to LZ3 more brightly. In addition, the coherent light beams from different laser sources have no coherency. Therefore, the multiplexing of the scattering patterns further progresses, so that it is possible to allow the speckles to be more inconspicuous.

In addition, the irradiation device 60 may include a plurality of the light sources which generate the coherent light beams having different wavelength ranges. According to this example, a color which is hard to display by using a single laser beam is generated through additive color mixing, and the illuminated regions LZ1 to LZ3 can be illuminated with the generated color. In addition, in this case, in the projection device 20 or the transmission-type video display device 10, in the case where the spatial light modulators 30-1 to 30-3 include, for example, color filters and are capable of forming modulation image with respect to each coherent light beam having each wavelength range, the video can be displayed in a plurality of colors. In addition, although the spatial light modulators 30-1 to 30-3 do not includes color filters, in the case where the irradiation device 60 irradiates the coherent light beam having each wavelength range in a time division manner and the spatial light modulators 30-1 to 30-3 operate in a time division manner so as to form modulation image corresponding to the irradiated coherent light beam having the wavelength range, the video can be displayed in a plurality of colors. Particularly, in the projection device 20 or the transmission-type video display device 10, in the case where the irradiation device 60 includes a light source which generates the coherent light beam having a wavelength range corresponding to red light, a light source which generates the coherent light beam having a wavelength range corresponding to green light, and a light source which generates the coherent light beam having a wavelength range corresponding to blue light, the video can be displayed in full colors.

In addition, the hologram recording media 55-1 to 55-3 included in the optical element 50 have wavelength selectivity. Therefore, in the case where the irradiation device 60 includes light sources having different wavelength ranges, the hologram recording media 55-1 to 55-3 may be configured to include hologram components corresponding to the wavelength ranges of the coherent light beams generated from the light sources in a laminated state. The hologram components for the coherent light beams having the wavelength ranges may be manufactured by using the coherent light beams having the corresponding wavelength ranges as the light beams for exposing (reference light beam Lr and object light beam Lo), for example, in the method described above with reference to FIGS. 3 and 4. In addition, instead of manufacturing the hologram recording media 55-1 to 55-3 by laminating the hologram components for the wavelength ranges, the hologram photosensitive material 58 is simultaneously exposed with the object light beam Lo and the reference light beam Lr which are obtained from the coherent light beams having the wavelength ranges, and a plurality of light beams having wavelength ranges are diffracted by single hologram recording media 55-1 to 55-3.

(Optical Element)

In the embodiment described above, although the example where the optical element 50 is configured with the reflection-type volume hologram recording media 55-1 to 55-3 using photopolymer is described, the present invention is not limited thereto. In addition, the optical element 50 may include a type of a volume hologram recording medium where recording is performed by using a photosensitive medium including a silver halide material. In addition, the optical element 50 may include a reflection-type volume hologram recording medium, and the optical element 50 may include a relief type (emboss type) hologram recording medium.

With respect to the relief type (emboss type) hologram recording medium, hologram interference fringe is recorded by using a convex-concave structure of a surface thereof. However, in the case of the relief type hologram recording medium, since scattering due to the convex-concave structure of the surface may also cause occurrence of new speckles, the volume hologram recording medium is preferred. In the case of the volume hologram recording medium, hologram interference fringe is recorded by using a refractive index modulation pattern (refractive index distribution) of an inner portion of the medium, there is no influence of the scattering due to the convex-concave structure of the surface.

However, even in the case of the volume hologram recording medium, if recording is performed by using a photosensitive medium including a silver halide material, scattering due to silver halide particles may also cause occurrence of speckles. Therefore, as the hologram recording media 55-1 to 55-3, the volume hologram recording medium using a photopolymer is preferred.

The reflection-type hologram recording medium is higher than the transmission-type hologram recording medium in terms of the wavelength selectivity. In other words, in the reflection-type hologram recording medium, although interference fringes corresponding to a different wavelength are laminated, a coherent light beam having a desired wavelength can be diffracted by using only a desired layer. In addition, in terms of removing the influence of the zeroth-order light beam, the reflection-type hologram recording medium is excellent.

On the other hand, although the transmission-type hologram recording medium has a wide diffractable spectrum range and a high degree of allowance of the laser source, if interference fringes corresponding to different wavelengths are laminated, layers other than a desired layer also diffract the coherent light beam having a desired wavelength. Therefore, in general, it is difficult to configure the transmission-type hologram recording medium in a lamination structure.

In addition, in the exposing process illustrated in FIG. 3, although a so-called Fresnel type hologram recording medium is manufactured, a Fourier transform type hologram recording medium which can be obtained through recording using lenses may be manufactured. However, in the case of using a Fourier transform type hologram recording medium, the lenses can be used even during the reproduction.

In addition, a striped pattern (refractive index modulation pattern or convex-concave pattern) which is to be formed on the hologram recording media 55-1 to 55-3 may be designed by using a computer based on wavelengths or incident directions of predetermined reproduction illumination light beams La1 to La3, shapes or positions of to-be-reproduced images, and the like without use of the actual object light beam Lo and the reference light beam Lr. The hologram recording media 55-1 to 55-3 obtained in this manner are called computer generated hologram recording media. In addition, similarly to the modified example described above, in the case where a plurality of the coherent light beams having mutually different wavelength ranges are irradiated from the irradiation device 60, the hologram recording media 55-1 to 55-3 as the computer generated hologram recording media may be configured so as to be partitioned two-dimensionally into a plurality of regions disposed corresponding to the coherent light beams having the wavelength ranges, and the coherent light beams having the wavelength ranges are diffracted by the corresponding regions to reproduce images.

In addition, in the embodiment described above, although the example where the optical element 50 includes the hologram recording media 55-1 to 55-3 which spread the coherent light beams irradiated to the positions thereof and illuminate the corresponding illuminated regions LZ1 to LZ3 with the spread coherent light beams is described, the present invention is not limited thereto. Instead of the hologram recording media 55-1 to 55-3 or in addition to the hologram recording media 55-1 to 55-3, the optical element 50 may include a plurality of lens arrays (light diffusion elements) as optical components capable of changing the propagation direction of the incident light beam and diffusing the light beam and illuminating the corresponding illuminated region among a plurality of the illuminated regions LZ1 to LZ3. As a specific example of the lens array, a total reflection-type or refraction-type Fresnel lens added with a diffusion function, a fly-eye lens, or the like may be exemplified. In the illumination device 40, the irradiation device 60 and the optical element 50 may also configured so that the irradiation device 60 allows the coherent light beam to scan each lens array, irradiates the optical element 50 with the coherent light beam and so that the propagation direction of the coherent light beam incident from the irradiation device 60 to each position of the optical element 50 is changed by the corresponding lens array to be illuminated on the corresponding illuminated regions LZ1 to LZ3. Therefore, it is possible to effectively allow the speckles to be inconspicuous.

(Illuminating Method)

In the embodiment described above, as an example, the irradiation device 60 is configured so as to allow the coherent light beams to scan the optical element 50 in one-dimensional direction, and the hologram recording media 55-1 to 55-3 (or lens arrays) of the optical element 50 are configured so as to diffuse (spread, diverge) the coherent light beams irradiated to the positions in two-dimensional directions, so that the illumination device 40 illuminates the illuminated regions LZ1 to LZ3 in a two-dimensional manner. However, as described above, the present invention is not limited to. For example, the irradiation device 60 may be configured so as to allow the coherent light beams to scan the optical element 50 in two-dimensional directions, and the hologram recording media 55-1 to 55-3 (or lens arrays) of the optical element 50 may be configured so as to diffuse (spread, diverge) the coherent light beams irradiated to the positions in two-dimensional directions, so that the illumination device 40 illuminates the illuminated regions LZ1 to LZ3 in a two-dimensional manner (described above with reference to FIG. 9).

(Combination of Modified Examples)

In addition, although several modified examples of the basic embodiments are described hereinbefore, it is obvious that a combination of a plurality of the modified examples is available.

(Number of Screens)

In the description hereinbefore, although the example where the projection-type video display device 10 includes the three screens 15-1 to 15-3 is described, the projection-type video display device 10 may include two screens or four or more screens. In these cases, the projection device may include the hologram recording media, the spatial light modulators, and the projection optical systems, of which the respective number is equal to the number of screens. The images of the scattering plates are recorded in the hologram recording media. In addition, the projection device may include the irradiation device which irradiates the divided light beams of which the number is equal to the number of screens and allows each divided light beam as each reproduction illumination light beam to scan the corresponding hologram recording media.

The invention claimed is:

1. A projection device displaying video corresponding to each screen on a plurality of the screens, comprising:
    an optical element comprising a plurality of light diffusion elements capable of diffusing light;
    an irradiation device configured to irradiate the optical element with a plurality of illumination light beams, each illumination light beam scanning the corresponding light diffusion element;
    spatial light modulators, each spatial light modulator being illuminated with illumination light beam which is incident from the irradiation device to each light diffusion element to be diffused; and
    projection optical systems, each projection optical system projecting modulation image obtained on each spatial light modulator on corresponding screen,
    wherein the illumination light beam, which is incident to each position of each light diffusion element to be diffused, overlappedly illuminates on corresponding spatial light modulator, and
    wherein the irradiation device comprises:
    a light source configured to generate a coherent light beam;
    a light division unit configured to divide the coherent light beam from the light source to generate a plurality of divided light beams;
    optical fibers, each optical fiber transmitting each divided light beam from the light division unit; and
    a scan device configured to change propagation direction of each divided light beam transmitted by the optical fibers and allow each divided light beam as each illumination light beam to scan the corresponding light diffusion element.

2. The projection device according to claim 1, wherein the scan device comprises mirrors which reflect the divided light beams and changes propagation direction of each divided light beam by changing a direction of each mirror.

3. The projection device according to claim 1, wherein the scan device changes propagation direction of each divided light beam by changing direction of emitting end of each optical fiber.

4. The projection device according to claim 2, wherein each divided light beam is irradiated to one point of the corresponding mirror, each divided light beam reflected by the one point of the mirror constitutes a diverging flux from the corresponding one point, and each diverging flux is incident on the corresponding light diffusion element.

5. The projection device according to claim 2,
    wherein each divided light beam is irradiated to one point of the corresponding mirror, and each divided light beam reflected by the one point of the mirror constitutes a diverging flux from the corresponding one point, and
    wherein the projection device further comprises a parallel light generation unit which propagates each light beam constituting each diverging flux in a certain direction to generate parallel light flux and allows each parallel light flux to be incident on the corresponding light diffusion element.

6. The projection device according to claim 1, wherein the light diffusion element is a hologram recording medium.

7. The projection device according to claim 1, wherein the light diffusion element is a lens array.

8. A projection-type video display device comprising:
    the projection device according to claim 1; and
    screens on which modulation images obtained on the spatial light modulators are projected.

9. A projection device displaying video corresponding to each screen on a plurality of the screens, comprising:
    an optical element comprising a plurality of light diffusion elements capable of diffusing light;
    an irradiation device configured to irradiate the optical element with a plurality of illumination light beams, each illumination light beam scanning the corresponding light diffusion element;
    spatial light modulators, each spatial light modulator being illuminated with illumination light beam which is incident from the irradiation device to each light diffusion element to be diffused; and
    projection optical systems, each projection optical system projecting modulation image obtained on each spatial light modulator on corresponding screen,
    wherein the illumination light beam, which is incident to each position of each light diffusion element to be diffused, overlappedly illuminates on corresponding spatial light modulator, and
    wherein the irradiation device comprises:
    a light source configured to generate a coherent light beam;
    a light division unit configured to divide the coherent light beam from the light source to generate a plurality of divided light beams;
    a scan device configured to change propagation direction of each divided light beam from the light division unit; and
    optical fibers, each optical fiber transmitting each divided light beam incident from the scan device and irradiating the optical element with each divided light beam as each illumination light beam, and
    wherein the scan device allows each illumination light beam to scan the corresponding light diffusion element.

10. The projection device according to claim 9, wherein each illumination light beam constitutes a diverging flux from an emitting end of the corresponding optical fiber, and each diverging flux is incident on the corresponding light diffusion element.

11. The projection device according to claim 9, wherein the light diffusion element is a hologram recording medium.

12. The projection device according to claim 9, wherein the light diffusion element is a lens array.

13. A projection-type video display device comprising:
    the projection device according to claim 6; and
    screens on which modulation images obtained on the spatial light modulators are projected.

14. A projection device displaying video corresponding to each screen on a plurality of the screens, comprising:
    an optical element comprising a plurality of light diffusion elements capable of diffusing light;
    an irradiation device configured to irradiate the optical element with a plurality of illumination light beams, each illumination light beam scanning the corresponding light diffusion element;
    spatial light modulators, each spatial light modulator being illuminated with illumination light beam which is incident from the irradiation device to each light diffusion element to be diffused; and
    projection optical systems, each projection optical system projecting modulation image obtained on each spatial light modulator on corresponding screen, wherein the illumination light beam, which is incident to each position of each light diffusion element to be diffused, overlappedly illuminates on corresponding spatial light modulator, and wherein the irradiation device comprises:

a light source configured to generate a coherent light beam;

a light division unit configured to divide the coherent light beam from the light source to generate a plurality of divided light beams;

mirror optical systems, each mirror optical system transmitting each divided light beam from the light division unit; and a scan device configured to change propagation direction of each divided light beam incident from the mirror optical systems and allow each divided light beam as each illumination light beam to scan the corresponding light diffusion element.

15. The projection device according to claim 14, wherein the scan device comprises mirrors which reflect the divided light beams and changes propagation direction of each divided light beam by changing a direction of each mirror, and wherein each divided light beam is irradiated to one point of the corresponding mirror, each divided light beam reflected by the one point of the mirror constitutes a diverging flux from the corresponding one point, and each diverging flux is incident on the corresponding light diffusion element.

16. The projection device according to claim 14, wherein the scan device comprises mirrors which reflect the divided light beams and changes propagation direction of each divided light beam by changing a direction of each mirror, wherein each divided light beam is irradiated to one point of the corresponding mirror, each divided light beam reflected by the one point of the mirror constitutes a diverging flux from the corresponding one point, and wherein the projection device further comprises a parallel light generation unit which propagates each light beam constituting each diverging flux in a certain direction to generate parallel light flux and allows each parallel light flux to be incident on the corresponding light diffusion element.

17. A projection-type video display device comprising:

the projection device according to claim 14; and screens on which modulation images obtained on the spatial light modulators are projected.

18. A projection device displaying video corresponding to each screen on a plurality of the screens, comprising:

an optical element comprising a plurality of light diffusion elements capable of diffusing light;

an irradiation device configured to irradiate the optical element with a plurality of illumination light beams, each illumination light beam scanning the corresponding light diffusion element;

spatial light modulators, each spatial light modulator being illuminated with illumination light beam which is incident from the irradiation device to each light diffusion element to be diffused; and projection optical systems, each projection optical system projecting modulation image obtained on each spatial light modulator on corresponding screen, wherein the illumination light beam, which is incident to each position of each light diffusion element to be diffused, overlappedly illuminates on corresponding spatial light modulator, and wherein the irradiation device comprises:

a light source configured to generate a coherent light beam;

a scan device configured to change a propagation direction of the coherent light beam from the light source;

a collimation optical system configured to collimate the coherent light beam from the scan device;

a light division unit configured to divide the collimated coherent light beam to generate a plurality of divided light beams; and mirror optical systems, each mirror optical system transmitting each divided light beam from the light division unit and irradiating the optical element with each divided light beam as each illumination light beam, and wherein the scan device allows each illumination light beam to scan the corresponding light diffusion element.

19. The projection device according to claim 18, wherein each illumination light beam constitutes a parallel light flux, and each parallel light flux is incident on the corresponding light diffusion element.

* * * * *